United States Patent
Sun et al.

(10) Patent No.: US 12,295,035 B2
(45) Date of Patent: May 6, 2025

(54) CYCLIC PREFIX (CP) EXTENSION IN CHANNEL OCCUPANCY TIME (COT) SHARING FOR SIDELINK COMMUNICATION

(71) Applicant: QUALCOMM Incorporated, San Diego, CA (US)

(72) Inventors: Jing Sun, San Diego, CA (US); Xiaoxia Zhang, San Diego, CA (US); Changlong Xu, Beijing (CN); Chih-Hao Liu, San Diego, CA (US); Ozcan Ozturk, San Diego, CA (US); Yisheng Xue, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 17/906,509

(22) PCT Filed: Apr. 16, 2020

(86) PCT No.: PCT/CN2020/085166
§ 371 (c)(1),
(2) Date: Sep. 16, 2022

(87) PCT Pub. No.: WO2021/208031
PCT Pub. Date: Oct. 21, 2021

(65) Prior Publication Data
US 2023/0146161 A1    May 11, 2023

(51) Int. Cl.
*H04W 74/0816* (2024.01)
*H04L 27/26* (2006.01)
(Continued)

(52) U.S. Cl.
CPC ..... *H04W 74/0816* (2013.01); *H04L 27/2607* (2013.01); *H04W 72/25* (2023.01); *H04W 74/0866* (2013.01)

(58) Field of Classification Search
CPC ............ H04W 74/0816; H04W 72/25; H04W 74/0866; H04L 27/2607; H04L 27/2602;
(Continued)

(56) References Cited

U.S. PATENT DOCUMENTS 9,264,249 B2    2/2016 Zhang et al.
2017/0339530 A1    11/2017 Maaref
(Continued)

FOREIGN PATENT DOCUMENTS

CN    109845209 A    6/2019
CN    110521159 A    11/2019
(Continued)

OTHER PUBLICATIONS

Supplementary European Search Report—EP20930726—Search Authority—Berlin—Jan. 3, 2024.
(Continued)

*Primary Examiner* — Hashim S Bhatti
(74) *Attorney, Agent, or Firm* — QUALCOMM Incorporated

(57) ABSTRACT

Wireless communications systems and methods related to use of cyclic prefix (CP) extensions for channel occupancy time (COT) sharing among sidelink user equipment devices (UEs) are provided. A first UE detects a first sidelink transmission in a COT, the COT for sharing with multiple sidelink UEs including the first sidelink UE. The first UE may determine a CP extension length for transmitting a second sidelink transmission after the first sidelink transmission, where a gap duration between the first sidelink transmission and the second sidelink transmission satisfies a listen-before-talk (LBT) gap time threshold. The first UE may apply a CP extension having the CP extension length to
(Continued)

the second sidelink transmission and transmit, to a second sidelink UE, the second sidelink transmission with the CP extension.

35 Claims, 13 Drawing Sheets

(51) Int. Cl.
*H04W 72/25* (2023.01)
*H04W 74/08* (2009.01)

(58) Field of Classification Search
CPC ... H04L 1/1861; H04L 5/0055; H04L 1/1887; H04L 1/1893; H04L 1/1854
See application file for complete search history.

(56) References Cited

U.S. PATENT DOCUMENTS

| | | | |
|---|---|---|---|
| 2018/0368090 | A1 | 12/2018 | Kadambar et al. |
| 2019/0335501 | A1* | 10/2019 | Talarico ............... H04L 1/1887 |
| 2020/0029340 | A1 | 1/2020 | He et al. |
| 2020/0053670 | A1 | 2/2020 | Jung et al. |
| 2020/0313946 | A1* | 10/2020 | Sun .................. H04L 27/26025 |
| 2020/0322198 | A1* | 10/2020 | Fisher-Jeffes ..... H04W 74/0816 |
| 2023/0087182 | A1 | 3/2023 | Cui et al. |

FOREIGN PATENT DOCUMENTS

| | | |
|---|---|---|
| CN | 110831201 A | 2/2020 |
| WO | 2013148076 | 10/2013 |
| WO | 2020024854 A1 | 2/2020 |

OTHER PUBLICATIONS

Huawei et al., "Sidelink Physical Layer Structure for NR V2X", 3GPP TSG RAN WG1 Meeting #95 R1-1812206, Spokane, USA, Nov. 12-16, 2018, 12 Pages.
International Search Report and Written Opinion—PCT/CN2020/085166—ISA/EPO—Jan. 18, 2021.
OPPO: "Channel Access Procedures for NR-U", 3GPP TSG RAN WG1 #99, 3GPP Draft; R1-1912506, 3rd Generation Partnership Project (3GPP), Mobile Competence Centre; 650, Route Des Lucioles; F-06921 Sophia-Antipolis Cedex; France, vol. RAN WG1, No. Reno, USA; Nov. 18, 2019-Nov. 22, 2019, Nov. 9, 2019 (Nov. 9, 2019), 10 Pages, XP051823446, pp. 5-6.

* cited by examiner

CYCLIC PREFIX (CP) EXTENSION IN CHANNEL OCCUPANCY TIME (COT) SHARING FOR SIDELINK COMMUNICATION

CROSS-REFERENCE TO RELATED APPLICATIONS

The present application is a 35 U.S.C. 371 National Phase entry of Patent Cooperation Treaty (PCT) Application No. PCT/CN2020/085166, filed Apr. 16, 2020, which is hereby expressly incorporated herein by reference in its entirety.

TECHNICAL FIELD

This application relates to wireless communication systems, and more particularly to cyclic prefix (CP) extensions in channel occupancy time (COT) sharing among sidelink user equipment devices (UEs).

INTRODUCTION

Wireless communications systems are widely deployed to provide various types of communication content such as voice, video, packet data, messaging, broadcast, and so on. These systems may be capable of supporting communication with multiple users by sharing the available system resources (e.g., time, frequency, and power). A wireless multiple-access communications system may include a number of base stations (BSs), each simultaneously supporting communications for multiple communication devices, which may be otherwise known as user equipment (UE).

To meet the growing demands for expanded mobile broadband connectivity, wireless communication technologies are advancing from the long term evolution (LTE) technology to a next generation new radio (NR) technology, which may be referred to as $5^{th}$ Generation (5G). For example, NR is designed to provide a lower latency, a higher bandwidth or a higher throughput, and a higher reliability than LTE. NR is designed to operate over a wide array of spectrum bands, for example, from low-frequency bands below about 1 gigahertz (GHz) and mid-frequency bands from about 1 GHz to about 6 GHz, to high-frequency bands such as millimeter wave (mmWave) bands. NR is also designed to operate across different spectrum types, from licensed spectrum to unlicensed and shared spectrum. Spectrum sharing enables operators to opportunistically aggregate spectrums to dynamically support high-bandwidth services. Spectrum sharing can extend the benefit of NR technologies to operating entities that may not have access to a licensed spectrum.

In a wireless communication network, a BS may communicate with a UE in an uplink direction and a downlink direction. Sidelink was introduced in LTE to allow a UE to send data to another UE without tunneling through the BS and/or an associated core network. The LTE sidelink technology had been extended to provision for device-to-device (D2D) communications, vehicle-to-everything (V2X) communications, and/or cellular vehicle-to-everything (C-V2X) communications. Similarly, NR may be extended to support sidelink communications, D2D communications, V2X communications, and/or C-V2X over licensed bands and/or unlicensed bands.

BRIEF SUMMARY OF SOME EXAMPLES

The following summarizes some aspects of the present disclosure to provide a basic understanding of the discussed technology. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in summary form as a prelude to the more detailed description that is presented later.

For example, in an aspect of the disclosure, a method of wireless communication performed by a first sidelink user equipment (UE), includes: detecting a first sidelink transmission in a channel occupancy time (COT), the COT for sharing with multiple sidelink UEs including the first sidelink UE; determining a cyclic prefix (CP) extension length for transmitting a second sidelink transmission after the first sidelink transmission, a gap duration between the first sidelink transmission and the second sidelink transmission satisfying a listen-before-talk (LBT) gap time threshold; applying a CP extension having the CP extension length to the second sidelink transmission; and transmitting, to a second sidelink UE, the second sidelink transmission with the CP extension.

In an additional aspect of the disclosure, a first user equipment (UE) includes a processor configured to: detect a first sidelink transmission in a channel occupancy time (COT), the COT for sharing with multiple sidelink UEs including the first sidelink UE; determine a cyclic prefix (CP) extension length for transmitting a second sidelink transmission after the first sidelink transmission, a gap duration between the first sidelink transmission and the second sidelink transmission satisfying a listen-before-talk (LBT) gap time threshold; and apply a CP extension having the CP extension length to the second sidelink transmission; and a transceiver configured to transmit, to a second sidelink UE, the second sidelink transmission with the CP extension.

In an additional aspect of the disclosure, a non-transitory computer-readable medium having program code recorded thereon, the program code including code for causing a first sidelink user equipment (UE) to detect a first sidelink transmission in a channel occupancy time (COT), the COT for sharing with multiple sidelink UEs including the first sidelink UE; code for causing the first sidelink UE to determine a cyclic prefix (CP) extension length for transmitting a second sidelink transmission after the first sidelink transmission, wherein a gap duration between the first sidelink transmission and the second sidelink transmission satisfies a listen-before-talk (LBT) gap time threshold; code for causing the first sidelink UE to apply a CP extension having the CP extension length to the second sidelink transmission; and code for causing the first sidelink UE to transmit, to a second sidelink UE, the second sidelink transmission with the CP extension.

In an additional aspect of the disclosure, a first user equipment (UE) includes means for detecting a first sidelink transmission in a channel occupancy time (COT), the COT for sharing with multiple sidelink UEs; means for determining a cyclic prefix (CP) extension length for transmitting a second sidelink transmission after the first sidelink transmission, a gap duration between the first sidelink transmission and the second sidelink transmission satisfying a listen-before-talk (LBT) gap time threshold; means for applying a CP extension having the CP extension length to the second sidelink transmission; and means for transmitting, to a second sidelink UE, the second sidelink transmission with the CP extension.

Other aspects, features, and embodiments of the present invention will become apparent to those of ordinary skill in the art, upon reviewing the following description of specific, exemplary embodiments of the present invention in conjunction with the accompanying figures. While features of the present invention may be discussed relative to certain embodiments and figures below, all embodiments of the present invention can include one or more of the advantageous features discussed herein. In other words, while one or more embodiments may be discussed as having certain advantageous features, one or more of such features may also be used in accordance with the various embodiments of the invention discussed herein. In similar fashion, while exemplary embodiments may be discussed below as device, system, or method embodiments it should be understood that such exemplary embodiments can be implemented in various devices, systems, and methods.

DETAILED DESCRIPTION

Figure 1:
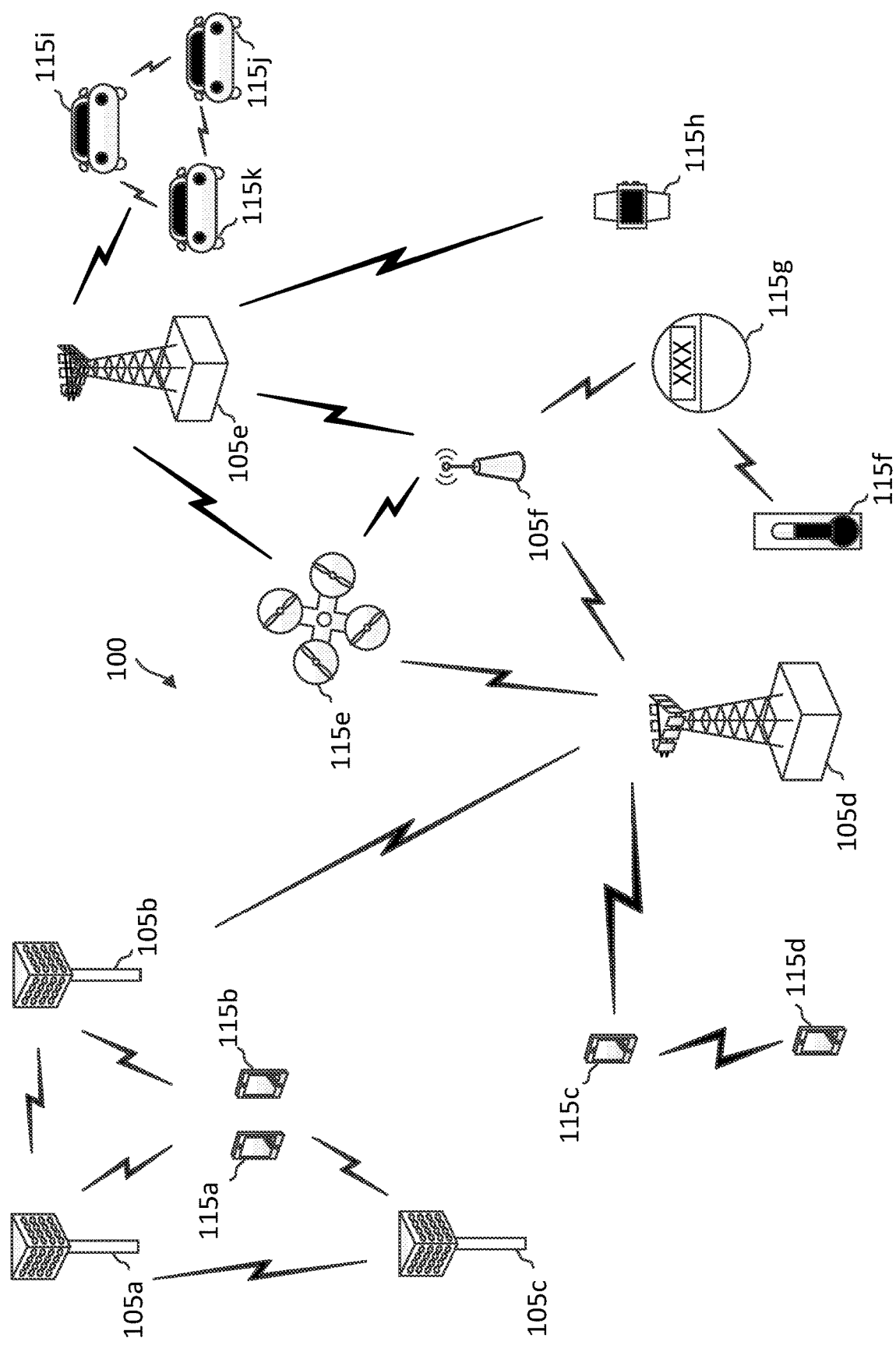
FIG. 1 illustrates a wireless communication network according to one or more aspects of the present disclosure.

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

This disclosure relates generally to wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, Global System for Mobile Communications (GSM) networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), Institute of Electrical and Electronics Engineers (IEEE) 802.11, IEEE 802.16, IEEE 802.20, flash-OFDM and the like. UTRA, E-UTRA, and GSM are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the UMTS mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with a ULtra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 5, 10, 20 MHz, and the like bandwidth (BW). For other various outdoor and small cell coverage deployments of TDD greater than 3 GHz, subcarrier spacing may occur with 30 kHz over 80/100 MHz BW. For other various indoor wideband implementations, using a TDD over the unlicensed portion of the 5 GHz band, the subcarrier spacing may occur with 60 kHz over a 160 MHz BW. Finally, for various deployments transmitting with mmWave components at a TDD of 28 GHz, subcarrier spacing may occur with 120 kHz over a 500 MHz BW.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with UL/downlink scheduling information, data, and acknowledgement in the same subframe. The self-contained integrated subframe supports communications in unlicensed or contention-based shared spectrum, adaptive UL/downlink that may be flexibly configured on a per-cell basis to dynamically switch between UL and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

NR technologies had been extended to operate over an unlicensed spectrum. The deployment of NR technologies over an unlicensed spectrum is referred to as NR-U. NR-U is targeted for operations over the 5 gigahertz (GHz) and 6 GHz bands, where there are well-defined channel access rules for sharing among operators of the same radio access technology (RAT) and/or of different RATs. When a BS operates over an unlicensed spectrum, the BS does not have ownership of the spectrum or control over the spectrum. Thus, the BS is required to contend for channel access in the spectrum, for example, via clear channel assessment (CCA) and/or listen-before-talk (LBT) procedures.

The provisioning of sidelink services, such as device-to-device (D2D), vehicle-to-vehicle (V2V), vehicle-to-everything (V2X), and/or cellular vehicle-to-everything (C-V2X) communications, over dedicated spectrum or licensed spectrum are relatively straight-forward as channel access in the dedicated spectrum or licensed spectrum is guaranteed. NR-U can bring benefit for sidelink services, for example, by offloading sidelink traffic to the unlicensed spectrum at no cost. However, channel access in a shared spectrum or an unlicensed spectrum is not guaranteed. Thus, to provision for sidelink services over a shared spectrum or unlicensed spectrum, sidelink user equipment devices (UEs) are required to contend for channel access in the spectrum, for example, via CCA and/or LBT procedures.

The present application describes mechanisms for sharing sidelink channel occupancy time (COT) for sidelink communications in a shared radio frequency band among sidelink UEs. For example, a first UE may contend for a COT in the shared radio frequency band for sidelink communication by performing a listen-before-talk (LBT) (e.g., a category 4 (CAT4) LBT) in the shared radio frequency band to acquire to a COT in the shared radio frequency band. After acquiring the COT, the first UE may transmit a sidelink data via a physical sidelink shared channel (PSSCH), a physical sidelink control channel (PSCCH), and/or a physical sidelink feedback channel (PSFCH) to another sidelink UE. The UE that acquires the COT may be referred to as an initiating UE and may transmit sidelink control information (SCI) indicating COT sharing information (e.g., a length of the initiating UE's transmission, a length of the remaining COT, whether the transmission supports frequency interlacing, and the like). A UE that monitors for the SCI may be referred to as a monitoring UE. Additionally, a UE that does not acquire the COT, but shares the COT acquired by another UE, may be referred to as a responding UE.

Certain frequency bands may have certain channel occupancy requirements. A channel occupancy may be defined by continuous transmissions in the channel. In slot-based transmissions, the initiating UE may continue to communicate during and share a COT as long as the initiating UE continues to occupy the channel. Because the initiating UE has already acquired the COT, the responding UE may perform a shorter LBT (e.g., CAT2 LBT or a CAT1 LBT) than the CAT4 LBT performed by the initiating UE to share the COT. Due to channel occupancy requirements, a UE may agree to surrender the channel if the UE has not occupied the channel for an LBT gap time threshold. Accordingly, if a slot structure has a gap duration that is longer than the LBT gap time threshold, the initiating UE will surrender the channel. In this example, the initiating UE may transmit once and then surrender the channel before a monitoring UE may take advantage of sharing the COT of the initiating UE. Instead of performing a CAT2 LBT or a CAT1 LBT to acquire the COT, the monitoring UE performs a CAT4 LBT to do so. Accordingly, if the gap duration exceeds an LBT gap time threshold (e.g., about 16 µs), the monitoring UE may be unable to take advantage of performing a shorter LBT to share the COT.

The present disclosure provides techniques for controlling one or more gap durations in a slot-based transmission. One way to create a transmission gap with a tight duration is to apply a CP extension to a transmission. In some examples, to control the gap duration for COT sharing, the responding UE may use a CP extension to create a gap duration between the initiating UE's transmission and the responding UE's transmission, where the gap duration satisfies an LBT gap time threshold (e.g., about 16 µs to about 25 µs). The responding UE may determine a CP extension length for transmitting a sidelink transmission after the initiating UE's sidelink transmission, where the gap duration between the responding UE's sidelink transmission and the initiating UE's sidelink transmission satisfies an LBT gap time threshold (e.g., about 16 µs or about 25 µs). Mechanisms for sidelink COT sharing using a CP extension are described in greater detail herein.

Aspects of the present disclosure can provide several benefits. For example, applying the CP extension having the CP extension length to the responding UE's sidelink transmission may enable the responding UE to take advantage of performing a shorter LBT (e.g., performing an CAT2 LBT or a CAT1 LBT instead of a CAT4 LBT). Thus, the disclosed examples can consume less time and fewer resources.

FIG. 1 illustrates a wireless communication network 100 according to one or more aspects of the present disclosure. The network 100 may be a 5G network. The network 100 includes a number of base stations (BSs) 105 (individually labeled as 105a, 105b, 105c, 105d, 105e, and 105f) and other network entities. A BS 105 may be a station that communicates with UEs 115 and may also be referred to as an evolved node B (eNB), a next generation eNB (gNB), an access point, and the like. Each BS 105 may provide communication coverage for a particular geographic area. In 3GPP, the term "cell" can refer to this particular geographic coverage area of a BS 105 and/or a BS subsystem serving the coverage area, depending on the context in which the term is used.

A BS 105 may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A BS for a macro cell may be referred to as a macro BS. A BS for a small cell may be referred to as a small cell BS, a pico BS, a femto BS or a home BS. In the example shown in FIG. 1, the BSs 105d and 105e may be regular macro BSs, while the BSs 105a-105c may be macro BSs enabled with one of three dimension (3D), full dimension (FD), or massive MIMO. The BSs 105a-105c may take advantage of their higher dimension MIMO capabilities to exploit 3D beamforming in both elevation and azimuth beamforming to increase coverage and capacity. The BS 105f may be a small cell BS which may be a home node or portable access point. A BS 105 may support one or multiple (e.g., two, three, four, and the like) cells.

The network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time.

The UEs 115 are dispersed throughout the wireless network 100, and each UE 115 may be stationary or mobile. A UE 115 may also be referred to as a terminal, a mobile station, a subscriber unit, a station, or the like. A UE 115 may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE 115 may be a device that includes a Universal Integrated Circuit Card (UICC). In another aspect, a UE may be a device that does not include a UICC. In some aspects, the UEs 115 that do not include UICCs may also be referred to as IoT devices or internet of everything (IoE) devices. The UEs 115a-115d are examples of mobile smart phone-type devices accessing network 100. A UE 115 may also be a machine specifically configured for connected communication, including machine type communication (MTC), enhanced MTC (eMTC), narrowband IoT (NB-IoT) and the like. The UEs 115e-115h are examples of various machines configured for communication that access the network 100. The UEs 115i-115k are examples of vehicles equipped with wireless communication devices configured for communication that access the network 100. A UE 115 may be able to communicate with any type of the BSs, whether macro BS, small cell, or the like. In FIG. 1, a lightning bolt (e.g., communication links) indicates wireless transmissions between a UE 115 and a serving BS 105, which is a BS designated to serve the UE 115 on the downlink (DL) and/or uplink (UL), desired transmission between BSs 105, backhaul transmissions between BSs, or sidelink transmissions between UEs 115.

In operation, the BSs 105a-105c may serve the UEs 115a and 115b using 3D beamforming and coordinated spatial techniques, such as coordinated multipoint (CoMP) or multi-connectivity. The macro BS 105d may perform backhaul communications with the BSs 105a-105c, as well as small cell, the BS 105f. The macro BS 105d may also transmits multicast services which are subscribed to and received by the UEs 115c and 115d. Such multicast services may include mobile television or stream video, or may include other services for providing community information, such as weather emergencies or alerts, such as Amber alerts or gray alerts.

The BSs 105 may also communicate with a core network. The core network may provide user authentication, access authorization, tracking, Internet Protocol (IP) connectivity, and other access, routing, or mobility functions. At least some of the BSs 105 (e.g., which may be an example of a gNB or an access node controller (ANC)) may interface with the core network through backhaul links (e.g., NG-C, NG-U, etc.) and may perform radio configuration and scheduling for communication with the UEs 115. In various examples, the BSs 105 may communicate, either directly or indirectly (e.g., through core network), with each other over backhaul links (e.g., X1, X2, etc.), which may be wired or wireless communication links.

The network 100 may also support mission critical communications with ultra-reliable and redundant links for mission critical devices, such as the UE 115e, which may be a drone. Redundant communication links with the UE 115e may include links from the macro BSs 105d and 105e, as well as links from the small cell BS 105f. Other machine type devices, such as the UE 115f (e.g., a thermometer), the UE 115g (e.g., smart meter), and UE 115h (e.g., wearable device) may communicate through the network 100 either directly with BSs, such as the small cell BS 105f, and the macro BS 105e, or in multi-step-size configurations by communicating with another user device which relays its information to the network, such as the UE 115f communicating temperature measurement information to the smart meter, the UE 115g, which is then reported to the network through the small cell BS 105f. The network 100 may also provide additional network efficiency through dynamic, low-latency TDD/FDD communications, such as V2V, V2X, C-V2X communications between a UE 115$i$, 115$j$, or 115$k$ and other UEs 115, and/or vehicle-to-infrastructure (V2I) communications between a UE 115$i$, 115$j$, or 115$k$ and a BS 105.

In some implementations, the network 100 utilizes OFDM-based waveforms for communications. An OFDM-based system may partition the system BW into multiple (K) orthogonal subcarriers, which are also commonly referred to as subcarriers, tones, bins, or the like. Each subcarrier may be modulated with data. In some instances, the subcarrier spacing between adjacent subcarriers may be fixed, and the total number of subcarriers (K) may be dependent on the system BW. The system BW may also be partitioned into subbands. In other instances, the subcarrier spacing and/or the duration of TTIs may be scalable.

In some aspects, the BSs 105 can assign or schedule transmission resources (e.g., in the form of time-frequency resource blocks (RB)) for downlink (DL) and uplink (UL) transmissions in the network 100. DL refers to the transmission direction from a BS 105 to a UE 115, whereas UL refers to the transmission direction from a UE 115 to a BS 105. The communication can be in the form of radio frames. A radio frame may be divided into a plurality of subframes or slots, for example, about 10. Each slot may be further divided into mini-slots. In a FDD mode, simultaneous UL and DL transmissions may occur in different frequency bands. For example, each subframe includes a UL subframe in a UL frequency band and a DL subframe in a DL frequency band. In a TDD mode, UL and DL transmissions occur at different time periods using the same frequency band. For example, a subset of the subframes (e.g., DL subframes) in a radio frame may be used for DL transmissions and another subset of the subframes (e.g., UL subframes) in the radio frame may be used for UL transmissions.

The DL subframes and the UL subframes can be further divided into several regions. For example, each DL or UL subframe may have pre-defined regions for transmissions of reference signals, control information, and data. Reference signals are predetermined signals that facilitate the communications between the BSs 105 and the UEs 115. For example, a reference signal can have a particular pilot pattern or structure, where pilot tones may span across an operational BW or frequency band, each positioned at a pre-defined time and a pre-defined frequency. For example, a BS 105 may transmit cell specific reference signals (CRSs) and/or channel state information—reference signals (CSI-RSs) to enable a UE 115 to estimate a DL channel. Similarly, a UE 115 may transmit sounding reference signals (SRSs) to enable a BS 105 to estimate a UL channel. Control information may include resource assignments and protocol controls. Data may include protocol data and/or operational data. In some aspects, the BSs 105 and the UEs 115 may communicate using self-contained subframes. A self-contained subframe may include a portion for DL communication and a portion for UL communication. A self-contained subframe can be DL-centric or UL-centric. A DL-centric subframe may include a longer duration for DL communication than for UL communication. A UL-centric subframe may include a longer duration for UL communication than for DL communication.

In some aspects, the network 100 may be an NR network deployed over a licensed spectrum. The BSs 105 can transmit synchronization signals (e.g., including a primary synchronization signal (PSS) and a secondary synchronization signal (SSS)) in the network 100 to facilitate synchronization. The BSs 105 can broadcast system information associated with the network 100 (e.g., including a master information block (MIB), remaining system information (RMSI), and other system information (OSI)) to facilitate initial network access. In some instances, the BSs 105 may broadcast the PSS, the SSS, and/or the MIB in the form of synchronization signal block (SSBs) over a physical broadcast channel (PBCH) and may broadcast the RMSI and/or the OSI over a physical downlink shared channel (PDSCH).

In some aspects, a UE 115 attempting to access the network 100 may perform an initial cell search by detecting a PSS from a BS 105. The PSS may enable synchronization of period timing and may indicate a physical layer identity value. The UE 115 may then receive a SSS. The SSS may enable radio frame synchronization, and may provide a cell identity value, which may be combined with the physical layer identity value to identify the cell. The PSS and the SSS may be located in a central portion of a carrier or any suitable frequencies within the carrier.

After receiving the PSS and SSS, the UE 115 may receive a MIB. The MIB may include system information for initial network access and scheduling information for RMSI and/or OSI. After decoding the MIB, the UE 115 may receive RMSI and/or OSI. The RMSI and/or OSI may include radio resource control (RRC) information related to random access channel (RACH) procedures, paging, control resource set (CORESET) for physical downlink control channel (PDCCH) monitoring, physical UL control channel (PUCCH), physical UL shared channel (PUSCH), power control, and SRS.

After obtaining the MIB, the RMSI and/or the OSI, the UE 115 can perform a random access procedure to establish a connection with the BS 105. In some examples, the random access procedure may be a four-step random access procedure. For example, the UE 115 may transmit a random access preamble and the BS 105 may respond with a random access response. The random access response (RAR) may include a detected random access preamble identifier (ID) corresponding to the random access preamble, timing advance (TA) information, a UL grant, a temporary cell-radio network temporary identifier (C-RNTI), and/or a back-off indicator. Upon receiving the random access response, the UE 115 may transmit a connection request to the BS 105 and the BS 105 may respond with a connection response. The connection response may indicate a contention resolution. In some examples, the random access preamble, the RAR, the connection request, and the connection response can be referred to as message 1 (MSG1), message 2 (MSG2), message 3 (MSG3), and message 4 (MSG4), respectively. In some examples, the random access procedure may be a two-step random access procedure, where the UE 115 may transmit a random access preamble and a connection request in a single transmission and the BS 105 may respond by transmitting a random access response and a connection response in a single transmission.

After establishing a connection, the UE 115 and the BS 105 can enter a normal operation stage, where operational data may be exchanged. For example, the BS 105 may schedule the UE 115 for UL and/or DL communications. The BS 105 may transmit UL and/or DL scheduling grants to the UE 115 via a PDCCH. The scheduling grants may be transmitted in the form of DL control information (DCI). The BS 105 may transmit a DL communication signal (e.g., carrying data) to the UE 115 via a PDSCH according to a DL scheduling grant. The UE 115 may transmit a UL communication signal to the BS 105 via a PUSCH and/or PUCCH according to a UL scheduling grant.

In some aspects, the BS 105 may communicate with a UE 115 using HARQ techniques to improve communication reliability, for example, to provide a URLLC service. The BS 105 may schedule a UE 115 for a PDSCH communication by transmitting a DL grant in a PDCCH. The BS 105 may transmit a DL data packet to the UE 115 according to the schedule in the PDSCH. The DL data packet may be transmitted in the form of a transport block (TB). If the UE 115 receives the DL data packet successfully, the UE 115 may transmit a HARQ ACK to the BS 105. Conversely, if the UE 115 fails to receive the DL transmission successfully, the UE 115 may transmit a HARQ NACK to the BS 105. Upon receiving a HARQ NACK from the UE 115, the BS 105 may retransmit the DL data packet to the UE 115. The retransmission may include the same coded version of DL data as the initial transmission. Alternatively, the retransmission may include a different coded version of the DL data than the initial transmission. The UE 115 may apply soft-combining to combine the encoded data received from the initial transmission and the retransmission for decoding. The BS 105 and the UE 115 may also apply HARQ for UL communications using substantially similar mechanisms as the DL HARQ.

In some aspects, the network 100 may operate over a system BW or a component carrier (CC) BW. The network 100 may partition the system BW into multiple BWPs (e.g., portions). A BS 105 may dynamically assign a UE 115 to operate over a certain BWP (e.g., a certain portion of the system BW). The assigned BWP may be referred to as the active BWP. The UE 115 may monitor the active BWP for signaling information from the BS 105. The BS 105 may schedule the UE 115 for UL or DL communications in the active BWP. In some aspects, a BS 105 may assign a pair of BWPs within the CC to a UE 115 for UL and DL communications. For example, the BWP pair may include one BWP for UL communications and one BWP for DL communications.

In some aspects, the network 100 may operate over a shared channel, which may include shared frequency bands or unlicensed frequency bands. For example, the network 100 may be an NR-unlicensed (NR-U) network operating over an unlicensed frequency band. In such an aspect, the BSs 105 and the UEs 115 may be operated by multiple network operating entities. To avoid collisions, the BSs 105 and the UEs 115 may employ an LBT procedure to monitor for transmission opportunities (TXOPs) in the shared channel. A wireless communication device may perform an LBT in the shared channel. LBT is a channel access scheme that may be used in the unlicensed spectrum. When the LBT results in an LBT pass (the wireless communication device wins contention for the wireless medium), the wireless communication device may access the shared medium to transmit and/or receive data. For example, a transmitting node (e.g., a BS 105 or a UE 115) may perform an LBT prior to transmitting in the channel. When the LBT passes, the transmitting node may proceed with the transmission. When the LBT fails, the transmitting node may refrain from transmitting in the channel. In an example, the LBT may be based on energy detection. For example, the LBT results in a pass when signal energy measured from the channel is below a threshold. Conversely, the LBT results in a failure when signal energy measured from the channel exceeds the threshold. In another example, the LBT may be based on signal detection. For example, the LBT results in a pass when a channel reservation signal (e.g., a predetermined preamble signal) is not detected in the channel. A TXOP may also be referred to as channel occupancy time (COT).

Sidelink communications refers to the communications among UEs without tunneling through a BS and/or a core network. Sidelink communication can be communicated over a physical sidelink control channel (PSCCH) and a physical sidelink shared channel (PSSCH). The PSCCH and PSSCH are analogous to a physical downlink control channel (PDCCH) and a physical downlink shared channel (PDSCH) in downlink (DL) communication between a BS and a UE. For instance, the PSCCH may carry sidelink control information (SCI) and the PSSCH may carry SCI and/or sidelink data (e.g., user data). Each PSCCH is associated with a corresponding PSSCH, where SCI in a PSCCH may carry reservation and/or scheduling information for sidelink data transmission in the associated PSSCH. In some examples, a UE may transmit PSSCH carrying SCI, which may be indicated in two stages. In a first stage control (SCI-1), the UE may transmit PSCCH carrying information for resource allocation and decoding a second stage control. The first stage SCI may include at least one of a priority, PSSCH resource assignment, resource reservation period (if enabled), PSSCH DMRS pattern (if more than one pattern is configured), a second-stage SCI format (e.g., size of 2nd SCI), an amount of resources for the second-stage SCI, a number of PSSCH demodulation reference signal (DMRS) port(s), a modulation and coding scheme (MCS), etc. In a second stage control (SCI-2), the UE may transmit PSCCH carrying information for decoding the PSSCH. The second stage SCI may include a -bit L1 destination identifier (ID), an 8-bit L1 source ID, a HARQ process ID, a new data indicator (NDI), a redundancy version (RV), etc. Sidelink communication can also be communicated over a physical sidelink feedback control channel (PSFCH), which indicates an acknowledgement(ACK)-negative acknowledgement (NACK) for a previously transmitted PSSCH. Use cases for sidelink communication may include vehicle-to-everything (V2X), industrial IoT (IIoT), and/or NR-lite.

Some of the UEs 115 may communicate with each other in peer-to-peer communications. For example, a first UE may communicate with a second UE over a sidelink. In some instances, the sidelink may be a unicast bidirectional link, each between a pair of UEs. In some other instances, the sidelink may be multicast links supporting multicast sidelink services among the UEs. For instance, the first UE may transmit multicast data to the second UE over sidelinks. In some aspects, some of the UEs are associated with vehicles (e.g., similar to the UEs 115*i-k* in FIG. 1) and the communications over the sidelinks may be C-V2X communications. C-V2X communications may refer to communications between vehicles and any other wireless communication devices in a cellular network.

NR supports two modes of radio resource allocations (RRA), a mode-1 RRA and a mode-2 RRA, for sidelink over a licensed spectrum. The mode-1 RRA supports network controlled RRA that can be used for in-coverage sidelink communication. For instance, a serving BS may determine a radio resource on behalf of a sidelink UE and transmit an indication of the radio resource to the sidelink UE. The serving BS may provide a dynamic grant or may activate a configured sidelink grant for sidelink communications. Sidelink feedback can be reported back to the BS by the transmitting UE. The mode-2 RRA supports autonomous RRA for sidelink UEs to perform autonomous sidelink communications over a shared radio frequency band (e.g., in a shared radio spectrum or an unlicensed spectrum). In some aspects, the shared radio frequency band may be partitioned into multiple subchannels or frequency subbands. A sidelink UE may be configured to operate in a mode-2 RRA. For instance, the sidelink UE may be configured with a resource pool in the shared radio frequency band. Additionally, the channel access may be in units of sidelink communication frames in time. Each sidelink communication frame may include an LBT gap duration followed by a sidelink resource. A sidelink UE intending to transmit in a frequency subband may perform an LBT in the LBT gap duration. If the LBT is successful, the sidelink UE may proceed to transmit SCI and/or sidelink data in the following sidelink resource.

The present disclosure provides techniques for UEs to share sidelink COT resources. A plurality of UEs may communicate the sidelink communication using COT sharing. For example, a UE may acquire a COT and share the COT with one or more other UEs. The UE that acquires the COT may be referred to as an initiating UE. A UE that does not acquire the COT, but shares the COT acquired by another UE, may be referred to as a responding UE. The initiating UE and the responding UE may each perform an LBT before acquiring or sharing the COT for communicating sidelink transmissions. An LBT may be in a variety of modes. An LBT mode may be, for example, a category 4 (CAT4) LBT, a category 2 (CAT2) LBT, or a category 1 (CAT1) LBT. A CAT1 LBT is referred to a no LBT mode, where no LBT is to be performed prior to a transmission. A CAT2 LBT refers to an LBT without a random backoff period. For instance, a transmitting node may determine a channel measurement in a time interval and determine whether the channel is available or not based on a comparison of the channel measurement against a ED threshold. A CAT4 LBT refers to an LBT with a random backoff and a variable contention window (CW).

The initiating UE may perform a CAT4 LBT to acquire the COT. After the initiating UE acquires the COT, the initiating UE may transmit PSCCH carrying SCI indicating COT sharing information (e.g., a length of the initiating UE's transmission, a length of the remaining COT, whether the transmission supports frequency interlacing, and the like). A sidelink UE initiating a COT may indicate information about unused or available time and/or frequency domain resources in the COT that may be shared with other sidelink UEs.

A monitoring sidelink UE (e.g., the responding UE) may monitor for the COT sharing information and opportunistically join the COT and utilize the unused or available resources in the COT based on the detected COT sharing information. When a monitoring UE shares a COT acquired by the initiating UE, the monitoring UE may be referred to as a responding UE. The responding UE may perform an LBT prior to transmitting in the initiating UE's COT. The LBT mode of the LBT performed by the responding UE may depend on a gap duration between the initiating UE's sidelink transmission and the responding UE's sidelink transmission. For example, the responding UE may perform, depending on the gap duration, a CAT2 LBT or a CAT1 LBT to acquire or share the COT.

Certain frequency bands may have certain channel occupancy requirements. A channel occupancy may be defined by continuous transmissions in the channel. In slot-based transmissions, the initiating UE may continue to communicate during and share a COT as long as the initiating UE continues to occupy the channel. Because the initiating UE has already acquired the COT, the responding UE may perform a shorter LBT (e.g., CAT2 LBT or a CAT1 LBT) than the CAT4 LBT performed by the initiating UE to share the COT. In some examples, a transmission slot may include a gap duration. The initiating UE agrees to surrender the channel if the UE has not occupied the channel for an LBT gap time threshold. Accordingly, if the slot structure has a gap duration that is longer than the LBT gap time threshold, the initiating UE will surrender the channel. If the LBT gap time threshold is 16 microseconds ($\mu$s) and a subcarrier spans about 15, 30, or 60 kHz in frequency, the gap duration in a slot structure (e.g., V2X PSCCH/PSSCH) may span about one symbol, which has a duration longer than 16 $\mu$s. In this example, the initiating UE may transmit once and then surrender the channel before a monitoring UE may take advantage of sharing the COT of the initiating UE. Instead of performing a CAT2 LBT or a CAT1 LBT to acquire the COT, the monitoring UE performs a CAT4 LBT to do so. Accordingly, if the gap duration exceeds an LBT gap time threshold (e.g., about 16 $\mu$s), the monitoring UE may be unable to take advantage of performing a shorter LBT to share the COT.

The present disclosure provides techniques for controlling one or more gap durations in a slot-based transmission. One way to create a transmission gap with a tight duration is to apply a CP extension to a transmission. In some examples, to control the gap duration for COT sharing, the responding UE may use a CP extension to create a gap duration between the initiating UE's transmission and the responding UE's transmission, where the gap duration satisfies an LBT gap time threshold (e.g., about 16 $\mu$s to about 25 $\mu$s). For instance, a communication signal may include one or more OFDM symbols and a CP extension can be prepended or attached to a beginning symbol of the one or more OFDM symbols to reduce a gap between a previous communication signal and the communication. For example, in an NR V2X waveform, the last symbol of a slot may be a gap, and the responding UE may use a CP extension to occupy a later portion of this symbol to shorten the gap duration such that the initiating UE does not surrender the COT and the responding UE is able to share the COT, without performing the longer CAT4 LBT. The responding UE may be responsible for maintaining the proper length gap from the previous transmission for COT sharing. The proper length gap depends on where the responding UE's transmission occurs relative to the end of the transmission burst of the initiating UE. The responding UE may determine a CP extension length for transmitting a sidelink transmission after the initiating UE's sidelink transmission, where a gap duration between the initiating UE's sidelink transmission and the responding UE's sidelink transmission satisfies the LBT gap time.

In some examples, the responding UE may select a length for the CP extension to provide a tight transmission gap for a certain LBT to be performed. In an example, the responding UE may select a length for the CP extension such that the gap duration may have a duration less than about 16 $\mu$s for no LBT to be performed prior to the responding UE's UL transmission. In another example, the responding UE may select a length for the CP extension such that the gap duration may have a duration of about 25 $\mu$s for a CAT2 LBT to be performed prior to the responding UE's UL transmission. A symbol duration may vary depending on an SCS and a number of subcarriers in a symbol, and thus a maximum CP extension length may be dependent on the SCS and the number of subcarriers in a symbol. Mechanisms for applying a CP extension to a sidelink communication transmitted during a shared COT are described in greater detail herein.

Figure 2:
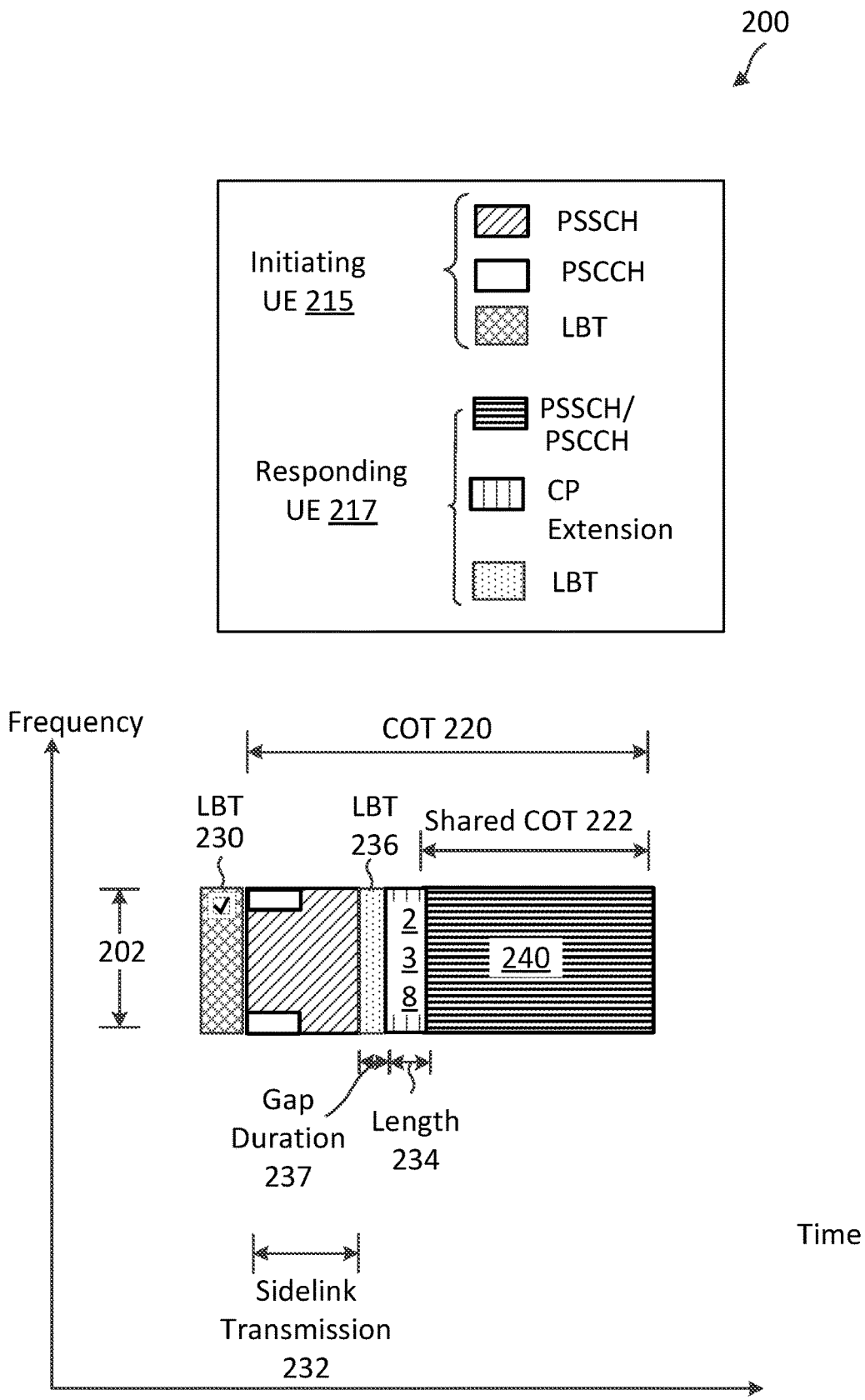
FIG. 2 illustrates a sidelink communication scheme that uses time division multiplex (TDM) COT sharing according to one or more aspects of the present disclosure.

FIG. 2 illustrates a sidelink communication scheme 200 that uses time division multiplex (TDM) COT sharing according to one or more aspects of the present disclosure. The scheme 200 may be employed by a UE 215. The UE 215 may correspond to a UE 115 in a network such as the network 100. In particular, the UE 215 may communicate with one or more other UEs over a sidelink. The x-axis represents time in some arbitrary units, and the y-axis represents frequency in some arbitrary units. The network may support TDM COT sharing between sidelink UEs.

In FIG. 2, a frequency band 202 may be a shared radio frequency band or an unlicensed band shared by a plurality of network operating entities. The frequency band 202 may, for example, have a BW of about 10 megahertz (MHz) or about 20 MHz and a subcarrier spacing (SCS) of about 15 kilohertz (kHz), about 20 kHz, or about 60 kHz. The frequency band 202 may be located at any suitable frequencies. In some aspects, the frequency band 202 may be located at about 2.5 GHz, 6 GHz, or 20 GHz.

A UE 215 may contend for a COT 202 in a frequency band 202, which may be a shared radio frequency band and/or an unlicensed band, for sidelink communication with another UE (e.g., the UE 217) over a sidelink. To communicate sidelink communication over the frequency band 202, the UE 215 may perform an LBT 230 to contend for the COT 220 in the frequency band 202. LBT may refer to a channel sensing mechanism used by devices (e.g., UE 215) to determine the presence of other signals in the channel prior to transmission and to avoid collisions with other transmissions. A device may sense the medium for a period of time. In an example, the UE 215 may perform a CAT4 to contend for the COT 220. If the LBT 230 fails, the UE 215 may refrain from transmitting in the frequency band 202. However, if the LBT 230 is successful, the UE 215 may proceed to use the COT 220 for sidelink communication. In the illustrated example of FIG. 2, the LBT 230 is successful as shown by the checkmark. Thus, the UE 215 may communicate sidelink communication with the UE 217 in the frequency band 202 during the COT 220. For example, the UE 215 may acquire the COT 220 and transmit a sidelink communication 232 including PSSCH (indicated by the patterned box corresponding to sidelink transmission 232) and/or PSCCH (indicated by the two white boxes corresponding to sidelink transmission 232). The PSCCH may indicate SCI, which may carry information indicating when the sidelink communication 232 will end and the length of the remaining COT 220.

The UE 215 may share the COT 220 with one or more other UEs. The UE 215 may have acquired a COT 220 with a duration longer that what is required for transmitting the UE 215's sidelink communication 232. Thus, there may be unused time domain resources in the COT 220. The UE 217 may monitor PSCCH from other UEs (including the UE 215) and recover COT sharing information from the SCI. The UE 217 may desire to share the COT 220 that was acquired by the initiating UE 215 and transmit a sidelink communication 240 (e.g., PSCCH and/or PSSCH) during the shared COT 222. The responding UE 217 may compute a length 234 for a CP extension 238 such that a gap duration 237 between the sidelink transmission 232 and the sidelink transmission 240 satisfies an LBT gap time threshold (e.g., 16 μs or 25 μs). In an example, the gap duration 237 satisfies the LBT gap time threshold if the gap duration 237 is not greater than the LBT gap time threshold. For example, if the gap duration 237 satisfies an LBT gap time threshold for a CAT2 LBT, then the LBT 236 may be a CAT 2 LBT. The UE 217 may apply the CP extension 238 with the length 234 to the sidelink transmission 240 and perform the LBT 236. If the LBT 236 is successful, the responding UE 217 may transmit the sidelink communication 240 with the CP extension 238. If the LBT 236 fails, the responding UE 217 refrains from transmitting the sidelink communication 240. In another example, if the gap duration 237 satisfies a LBT gap time threshold for a CAT1 LBT (no LBT), then the LBT 236 may be a CAT1 LBT. The UE 215 may apply the CP extension 238 with the length 234 to the sidelink transmission 240 and transmit without an LBT.

Figure 3:
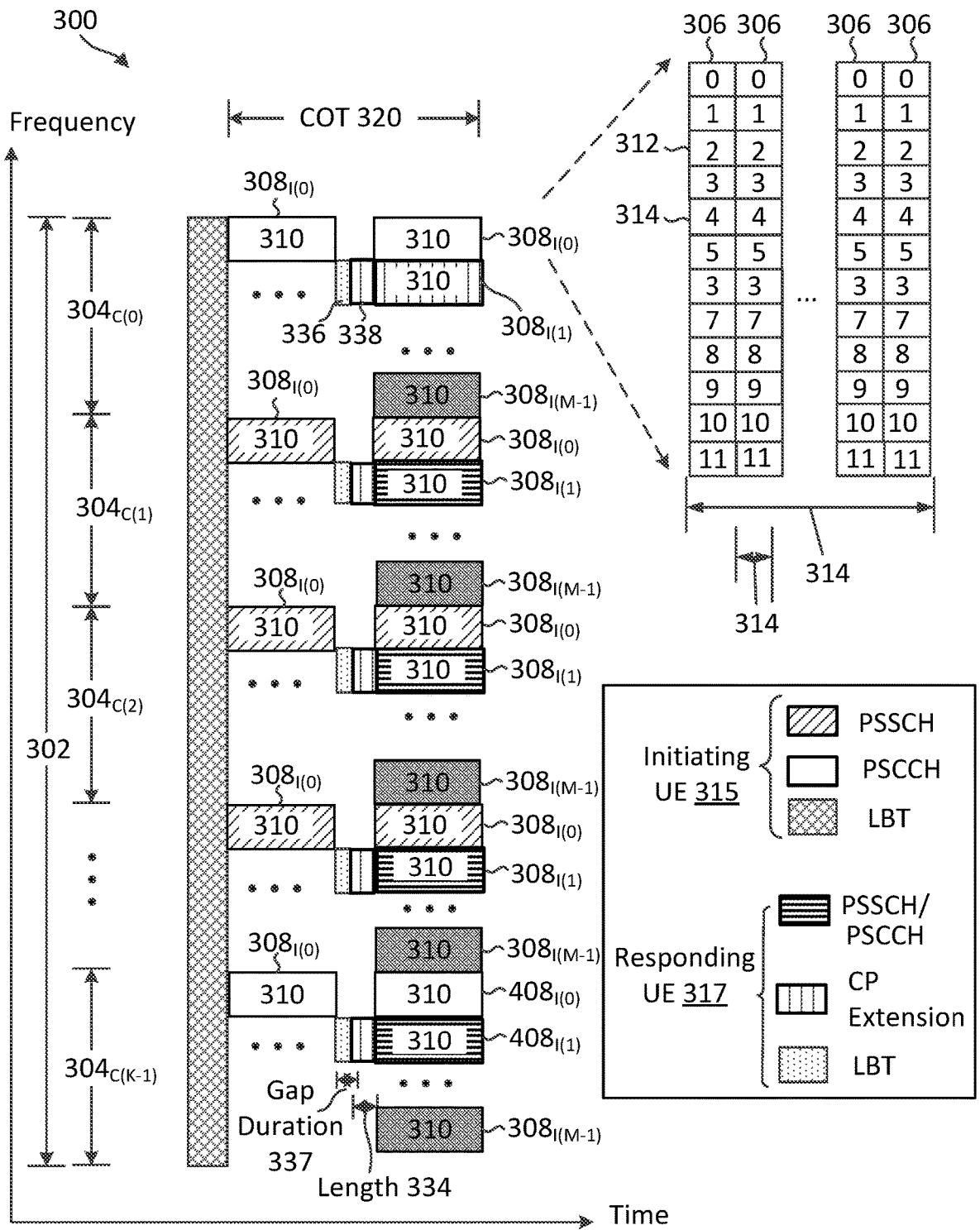
FIG. 3 illustrates a sidelink communication scheme that uses frequency division multiplex (FDM) COT sharing according to one or more aspects of the present disclosure.

To meet a BW occupancy requirement and/or a PSD requirement in a frequency band, a UE may transmit a sidelink communication using a frequency interlaced waveform, as shown in FIG. 3. Certain frequency bands may have certain BW occupancy requirements and/or a maximum allowable power spectral density (PSD). To meet BW occupancy requirements and/or boost transmit power under certain PSD limitations, sidelink transmissions in the network (e.g., network 100) may use a frequency-interlaced waveform. For example, an unlicensed band may be partitioned into a plurality of frequency interlaces and sidelink communications can be transmitted over one or more frequency interlaces.

FIG. 3 illustrates a sidelink communication scheme 300 that uses frequency division multiplex (FDM) COT sharing according to one or more aspects of the present disclosure. The scheme 300 may be employed by a UE 315. The UE 315 may correspond to a UE 115 in a network such as the network 100. In particular, the UE 315 may communicate with one or more other UEs over a sidelink. The x-axis represents time in some arbitrary units, and the y-axis represents frequency in some arbitrary units. The network may support frequency interlace-based COT sharing between sidelink UEs.

In FIG. 3, a frequency band 302 is partitioned into a plurality of frequency interlaces 308 shown as $308_{I(0)}$ to $308_{I(M-1)}$, where M is a positive integer. Each frequency interlace $308_{I(i)}$ may include K plurality of RBs 310 evenly spaced over the frequency band 302, where K is a positive integer and i may vary between 0 to M−1. In other words, the RBs 310 in a particular frequency interlace $308_{I(i)}$ are spaced apart from each other by at least one other RB 310. The frequency interlace $308_{I(0)}$ as shown by the pattern filled boxes includes RBs 310 from clusters $304_{C(0)}$ to $304_{C(K-1)}$. The values of K and M may vary based on several factors, such as the bandwidth, the SCS, and/or the PSD limitation of the frequency band 302.

In an aspect, the frequency band 302 may have a bandwidth of about 20 MHz and each subcarrier 312 may span about 15 kHz in frequency. In such an aspect, the frequency band 302 may include about ten frequency interlaces 308 (e.g., M=10). For example, an allocation may include one frequency interlace 308 having ten distributed or equally spaced RBs 310. Compared to an allocation with a single RB or ten localized RBs, the interlaced allocation with the ten distributed RBs 310 allows a UE to transmit with a higher BW occupancy. In another aspect, the frequency band 302 may have a bandwidth of about 20 MHz and each subcarrier 312 may span about 30 kHz in frequency. In such an aspect, the frequency band 302 may include about five frequency interlaces 308 (e.g., M=5). Similarly, an allocation may include one frequency interlace 308 having ten distributed RBs 310. The interlaced allocation with the ten distributed RBs may allow for a wider BW occupancy than an allocation with a single RB or ten localized RBs.

A group of M localized RBs 310 forms a cluster 304. As shown, the frequency interlaces $308_{I(0)}$ to $308_{I(M-1)}$ form K clusters $304_{C(0)}$ to $304_{C(K-1)}$. Each RB 310 may span about twelve contiguous subcarriers 312 in frequency and a time period 314. The subcarriers 312 are indexed from 0 to 11. The subcarriers 312 are also referred to as resource elements (REs). The time period 314 may span any suitable number of OFDM symbols 306. In some aspects, the time period 314 may correspond to one TTI, which may include about fourteen OFDM symbols 306.

While FIG. 3 illustrates the frequency interlaces 308 spanning one slot or one RB 310 duration (e.g., the time period 314), the frequency interlaces 308 can span a longer duration, for example, 2, 3, or more slots or any suitable number of symbol 306 durations. In some aspects, the RBs 310 are physical resource blocks (PRBs) and each frequency interlace 308 may include PRBs uniformly spaced in the frequency band 302.

In the scheme 300, an initiating UE 315 may select one or more frequency interlaces 308 for sidelink communication with another UE in a COT 320. As an example, the initiating UE 315 selects the frequency interlace $308_{I(0)}$ for sidelink communication with a sidelink UE in the COT 320. In some other examples, the initiating UE 315 may select a different frequency interlace $308_{I(m)}$, where m may be between 1 and M−1, for the sidelink communication. Additionally, the UE 315 may use any suitable number of frequency interlaces 308 for the sidelink communication, for example, between 1 to M number of frequency interlaces 308. The sidelink communication over the frequency interlace $308_{I(0)}$ may include sidelink data and SCI. The sidelink data may be communicated via a PSSCH. The SCI may be communicated via a PSCCH. The SCI may carry information or parameters related to the transmission of the PSSCH. In some examples, the SCI carries information needed to support interlace-based COT sharing. In interlace-based transmission, short transmission gaps may be introduced to allow other UEs to join in other interlaces. As discussed further below, the responding UE may use a CP extension to meet the short transmission gaps.

The initiating UE 315 may occupy frequency interlace $308_{I(0)}$ for sidelink communication and may share the COT with a responding UE, which will occupy another frequency interlace 308 in the frequency band 302 for sidelink communication. In some examples, the initiating UE 315 may acquire the COT 320 and may not require all frequency interlaces 308 in the frequency band 302 for each sidelink communication. Thus, there may be unused frequency interlaces 308 or frequency domain resources in the COT. The responding UE 317 may take advantage of the initiating UE 315's channel access after acquiring the COT 320 and may perform an LBT to occupy frequency interlace $308_{I(1)}$ for sidelink communication. The frequency interlace occupied by the initiating UE 315 is different from the frequency interlace occupied by the responding UE 317.

The responding UE 317 may monitor PSCCH from other UEs (including the UE 315) and recover COT sharing information from the SCI. For example, the UE 317 may determine, based on the SCI, that the interlace-based transmission is supported. The responding UE 317 may perform an LBT 336 to share the COT 320 and transmit in the frequency interlace $308_{I(1)}$. The responding UE 317 may compute a length 334 for a CP extension 338 such that a gap duration 337 between the initiating UE's sidelink transmission (e.g., PSSCH/PSCCH) corresponding to the frequency interlace $308_{I(0)}$ and the responding UE's sidelink transmission (e.g., PSSCH/PSCCH) corresponding to the frequency interlace $308_{I(1)}$ satisfies an LBT gap time threshold (e.g., 16 μs or 25 μs). In an example, the gap duration 337 satisfies the LBT gap time threshold if the gap duration 337 is not greater than the LBT gap time threshold. For example, if the gap duration 337 satisfies a LBT gap time threshold for a CAT2 LBT, then the LBT 336 may be a CAT 2 LBT. The UE 317 may apply the CP extension 338 with the length 334 to the responding UE's sidelink transmission. If the LBT 336 is successful, the responding UE 317 may transmit the sidelink communication with the CP extension 338 in the frequency interlace $308_{I(1)}$. If the LBT 336 fails, the responding UE 317 refrains from transmitting the sidelink communication. In another example, if the gap duration 337 satisfies a LBT gap time threshold for a CAT1 LBT (no LBT), then the LBT 336 may be a CAT1 LBT. The UE 317 may apply the CP extension 338 with the length 334 to the sidelink transmission and transmit the sidelink transmission in the frequency interlace $308_{I(1)}$ without an LBT.

Figure 4:
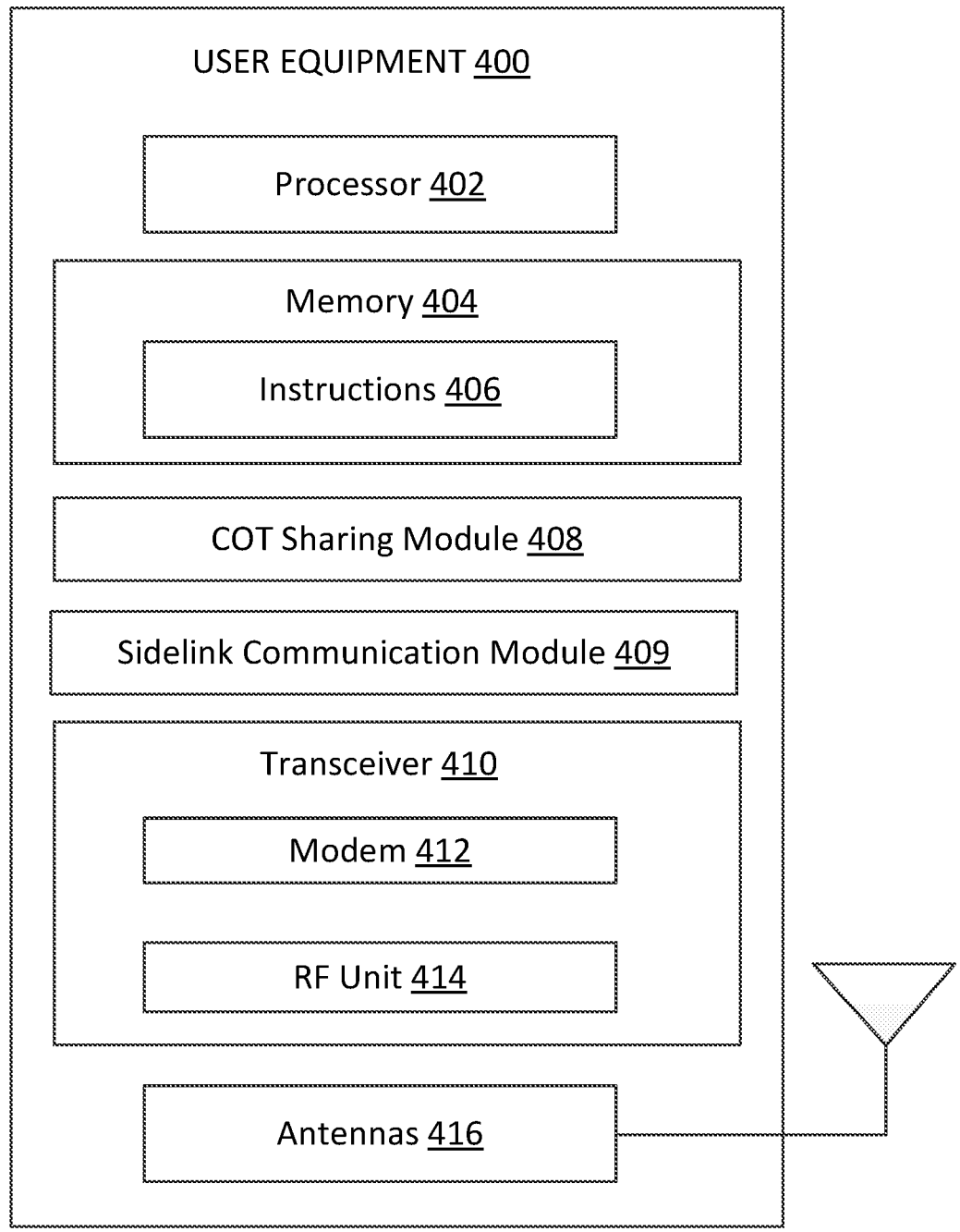
FIG. 4 is a block diagram of an example user equipment (UE) according to some aspects of the present disclosure.

FIG. 4 is a block diagram of an example UE 400 according to one or more aspects of the present disclosure. The UE 400 may be a UE 115 discussed above in FIG. 1, a UE 215 discussed above in FIG. 2, and/or a UE 315 discussed above in FIG. 3. As shown, the UE 400 may include a processor 402, a memory 404, a COT sharing module 408, a sidelink communication module 409, a transceiver 410 including a modem subsystem 412 and a radio frequency (RF) unit 414, and one or more antennas 416. These elements may be in direct or indirect communication with each other, for example via one or more buses.

The processor 402 may include a central processing unit (CPU), a digital signal processor (DSP), an application specific integrated circuit (ASIC), a controller, a field programmable gate array (FPGA) device, another hardware device, a firmware device, or any combination thereof configured to perform the operations described herein. The processor 402 may also be implemented as a combination of computing devices, e.g., a combination of a DSP and a microprocessor, a plurality of microprocessors, one or more microprocessors in conjunction with a DSP core, or any other such configuration.

The memory 404 may include a cache memory (e.g., a cache memory of the processor 402), random access memory (RAM), magnetoresistive RAM (MRAM), read-only memory (ROM), programmable read-only memory (PROM), erasable programmable read only memory (EPROM), electrically erasable programmable read only memory (EEPROM), flash memory, solid state memory device, hard disk drives, other forms of volatile and non-volatile memory, or a combination of different types of memory. In an aspect, the memory 404 includes a non-transitory computer-readable medium. The memory 404 may store, or have recorded thereon, instructions 406. The instructions 406 may include instructions that, when executed by the processor 402, cause the processor 402 to perform the operations described herein with reference to the UEs 115, 215, and/or 315 in connection with aspects of the present disclosure, for example, aspects of FIGS. 2, 3, and 6-13. Instructions 406 may also be referred to as program code. The program code may be for causing a wireless communication device to perform these operations, for example by causing one or more processors (such as processor 402) to control or command the wireless communication device to do so. The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The COT sharing module 408 and/or the sidelink communication module 409 may be implemented via hardware, software, or combinations thereof. For example, the COT sharing module 408 and/or the sidelink communication module 409 may be implemented as a processor, circuit, and/or instructions 406 stored in the memory 404 and executed by the processor 402. In some instances, the COT sharing module 408 and/or the sidelink communication module 409 can be integrated within the modem subsystem 412. For example, the COT sharing module 408 and/or the sidelink communication module 409 can be implemented by a combination of software components (e.g., executed by a DSP or a general processor) and hardware components (e.g., logic gates and circuitry) within the modem subsystem 412.

The COT sharing module 408 and/or the sidelink communication module 409 may be used for various aspects of the present disclosure, for example, aspects of FIGS. 2, 3, and 6-13. In some aspects, the COT sharing module 408 may be configured to detect a first sidelink transmission in a COT, the COT for sharing with multiple sidelink UEs including the UE 400. The UE 400 may share the COT with an initiating UE, and the first sidelink transmission may include PSSCH and/or PSCCH communications. For example, the COT sharing module 408 may detect COT sharing SCI in a PSSCH communication to enable the UE 400 to opportunistically join the COT and utilize any time and/or frequency resource not occupied by the initiating UE's sidelink communication.

The COT sharing module 408 may be configured to determine a CP extension length for transmitting a second sidelink transmission after the first sidelink transmission, where a gap duration between the first sidelink transmission and the second sidelink transmission satisfies an LBT gap time threshold (e.g., 16 μs or 25 μs). The COT sharing module 408 may be configured to apply a CP extension having the CP extension length to the second sidelink transmission. In some aspects, the sidelink communication module 409 may be configured to transmit, to the second sidelink UE, the second sidelink transmission with the CP extension.

As shown, the transceiver 410 may include the modem subsystem 412 and the RF unit 414. The transceiver 410 can be configured to communicate bi-directionally with other devices, such as the BSs 105. The modem subsystem 412 may be configured to modulate and/or encode the data from the memory 404, the COT sharing module 408, and/or the sidelink communication module 409 according to an MCS, e.g., a low-density parity check (LDPC) coding scheme, a turbo coding scheme, a convolutional coding scheme, a digital beamforming scheme, etc. The RF unit 414 may be configured to process (e.g., perform analog to digital conversion or digital to analog conversion, etc.) modulated/encoded data (e.g., PSSCH data and/or PSCCH control information, PSFCH ACK/NACK feedbacks, COT sharing SCI, HARQ ACK/NACK) from the modem subsystem 412 (on outbound transmissions) or of transmissions originating from another source such as a UE 115 or a BS 105. The RF unit 414 may be further configured to perform analog beamforming in conjunction with the digital beamforming. Although shown as integrated together in transceiver 410, the modem subsystem 412 and the RF unit 414 may be separate devices that are coupled together at the UE 115 to enable the UE 115 to communicate with other devices.

The RF unit 414 may provide the modulated and/or processed data, e.g. data packets (or, more generally, data messages that may contain one or more data packets and other information), to the antennas 416 for transmission to one or more other devices. The antennas 416 may further receive data messages transmitted from other devices. The antennas 416 may provide the received data messages for processing and/or demodulation at the transceiver 410. The transceiver 410 may provide the demodulated and decoded data (e.g., PSSCH data and/or PSCCH control information, PSFCH ACK/NACK feedbacks, COT sharing SCI, HARQ ACK/NACK) to the COT sharing module 408 and/or the sidelink communication module 409 for processing. The antennas 416 may include multiple antennas of similar or different designs in order to sustain multiple transmission links. The RF unit 414 may configure the antennas 416.

In an example, the transceiver 410 is configured to receive sidelink transmissions, PSCCH SCI, PSFCH ACK/NACK feedbacks from another UE, and/or sidelink COT sharing SCI, for example, by coordinating with the COT sharing module 408. In an example, the transceiver 410 is configured to transmit PSSCH data, PSFCH ACK/NACK feedbacks to another UE and/or receive PSSCH data, for example, by coordinating with the COT sharing module 408.

In an aspect, the UE 400 can include multiple transceivers 410 implementing different RATs (e.g., NR and LTE). In an aspect, the UE 400 can include a single transceiver 410 implementing multiple RATs (e.g., NR and LTE). In an aspect, the transceiver 410 can include various components, where different combinations of components can implement different RATs.

Figure 5:
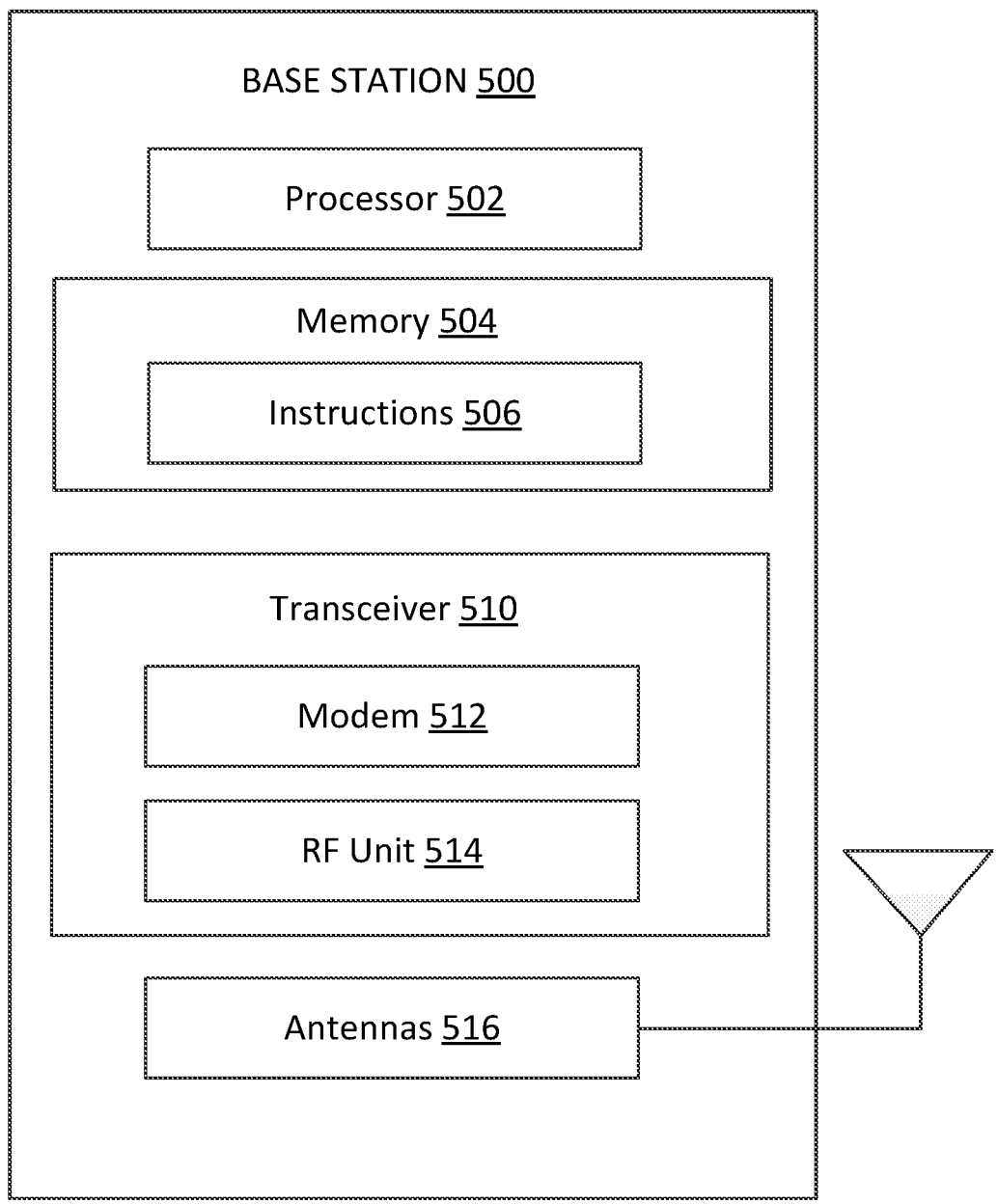
FIG. 5 is a block diagram of an example base station (BS) according to one or more aspects of the present disclosure.

FIG. 5 is a block diagram of an example BS 500 according to one or more aspects of the present disclosure. The BS 500 may be a BS 105 in the network 100 as discussed above in FIG. 1. A shown, the BS 500 may include a processor 502, a memory 504, a transceiver 510 including a modem subsystem 512 and a RF unit 514, and one or more antennas 516. These elements may be in direct or indirect communication with each other, for example via one or more buses.

The processor 502 may have various features as a specific-type processor. For example, these may include a CPU, a DSP, an ASIC, a controller, a FPGA device, another hardware device, a firmware device, or any combination thereof configured to perform the operations described herein. The processor 502 may also be implemented as a combination of computing devices, e.g., a combination of a DSP and a microprocessor, a plurality of microprocessors, one or more microprocessors in conjunction with a DSP core, or any other such configuration.

The memory 504 may include a cache memory (e.g., a cache memory of the processor 502), RAM, MRAM, ROM, PROM, EPROM, EEPROM, flash memory, a solid state memory device, one or more hard disk drives, memristor-based arrays, other forms of volatile and non-volatile memory, or a combination of different types of memory. In some aspects, the memory 504 may include a non-transitory computer-readable medium. The memory 504 may store instructions 506. The instructions 506 may include instructions that, when executed by the processor 502, cause the processor 502 to perform operations described herein, for example, aspects of FIG. 1. Instructions 506 may also be referred to as code, which may be interpreted broadly to include any type of computer-readable statement(s) as discussed above with respect to FIG. 4.

As shown, the transceiver 510 may include the modem subsystem 512 and the RF unit 514. The transceiver 510 can be configured to communicate bi-directionally with other devices, such as the UEs 115, 215, 315, and/or 400 and/or another core network element. The modem subsystem 512 may be configured to modulate and/or encode data according to a MCS, e.g., a LDPC coding scheme, a turbo coding scheme, a convolutional coding scheme, a digital beamforming scheme, etc. The RF unit 514 may be configured to process (e.g., perform analog to digital conversion or digital to analog conversion, etc.) modulated/encoded data (e.g., a sidelink resource configuration, sidelink COT sharing configuration) from the modem subsystem 512 (on outbound transmissions) or of transmissions originating from another source such as a UE 115, 215, 315, and/or 400. The RF unit 514 may be further configured to perform analog beamforming in conjunction with the digital beamforming. Although shown as integrated together in transceiver 510, the modem subsystem 512 and/or the RF unit 514 may be separate devices that are coupled together at the BS 105 to enable the BS 105 to communicate with other devices.

The RF unit 514 may provide the modulated and/or processed data, e.g. data packets (or, more generally, data messages that may contain one or more data packets and other information), to the antennas 516 for transmission to one or more other devices. This may include, for example, transmission of information to complete attachment to a network and communication with a camped UE 115, 215, 315, or 400 according to some aspects of the present disclosure. The antennas 516 may further receive data messages transmitted from other devices and provide the received data messages for processing and/or demodulation at the transceiver 510. The transceiver 510 may provide the demodulated and decoded data to any modules of the BS 500 for processing. The antennas 516 may include multiple antennas of similar or different designs in order to sustain multiple transmission links.

In an aspect, the BS 500 can include multiple transceivers 510 implementing different RATs (e.g., NR and LTE). In an aspect, the BS 500 can include a single transceiver 510 implementing multiple RATs (e.g., NR and LTE). In an aspect, the transceiver 510 can include various components, where different combinations of components can implement different RATs.

FIGS. 6-12 illustrate various mechanisms for a responding UE (e.g., the UEs 115, 215, 315 and/or 400) to share a COT acquired by an initiating UE for sidelink communication. In FIGS. 6-12, the schemes 600-1200 may be employed by a UE such as the UEs 115, 215, 315 and/or 400 in a network such as the network 100. In particular, the UE may acquire a COT and provide COT sharing information to allow other UEs to join the COT and/or or monitor for COT sharing information from another sidelink UE and join the other UE's COT as shown in the schemes 600-1200.

In some examples, the responding UE may be responsible for determining a length of the CP extension. The CP extension length may be based on where the initiating UE's sidelink transmission occurs (e.g., within the duration of the shared COT for FDM sidelink COT sharing, within the duration of the shared COT for TDM sidelink COT sharing, or outside the duration of the shared COT for TDM sidelink COT sharing) and/or where the responding UE's sidelink transmission occurs.

Figure 6:
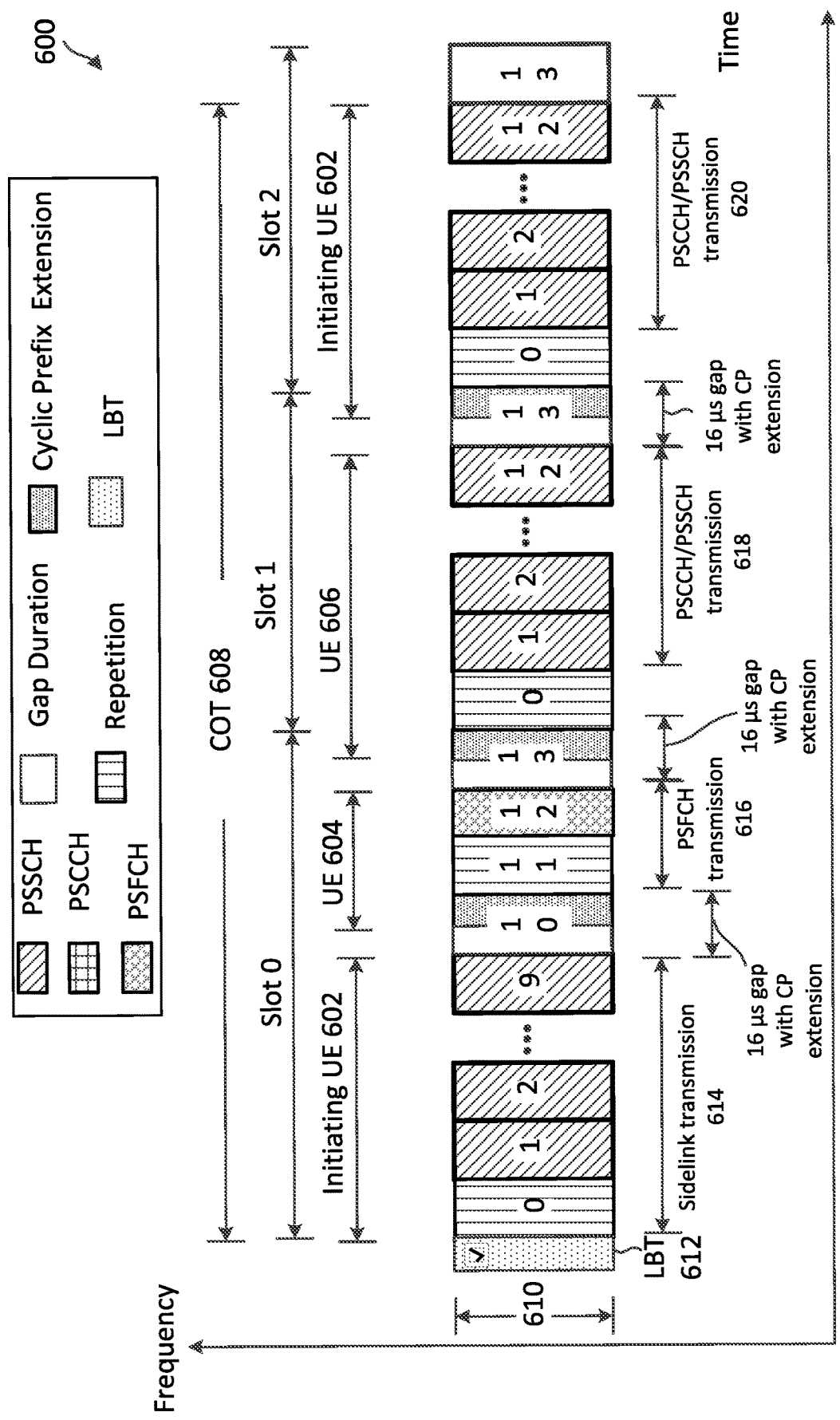
FIG. 6 illustrates a TDM sidelink channel occupancy time (COT) sharing scheme with active transmission according to one or more aspects of the present disclosure.

FIG. 6 illustrates a TDM sidelink COT sharing scheme 600 with active transmission according to one or more aspects of the present disclosure. The scheme 600 provisions for COT sharing among sidelink UEs (e.g., the UEs 115, 215, 315, and/or 400) using TDM sidelink sharing. The scheme 600 is described using a similar TDM structure as in the scheme 200. The scheme 600 may be employed by an initiating UE 602, a UE 604, and a UE 606. The UE 602, 604, or 606 may correspond to a UE 115 in a network such as the network 100. In particular, any of the UEs 602, 604, or 606 may communicate with one or more other UEs over a sidelink. The x-axis represents time in some arbitrary units, and the y-axis represents frequency in some arbitrary units.

In the scheme 600, an initiating UE 602 (e.g., the UEs 115, 215, 315, and/or 400) may initiate or contend for the COT 608 in a frequency band 610 by performing an LBT 612 in the frequency band 610. The UE 602 may monitor SCI, which may be transmitted at some predetermined resources in each slot. The SCI may provide COT information (e.g., the duration of the COT, whether other sidelink UEs can share the COT, etc.). The LBT 612 may be a CAT4 LBT similar to the LBT 230 in FIG. 2. The LBT 612 is a pass as shown by the checkmark indicating that the UE 602 acquired the COT 608. After acquiring the COT 608, the UE 602 may transmit a sidelink communication 614 to a second sidelink UE (e.g., UE 604, UE 606, or other UE) during the symbols 1-9 of slot 0 (as just one example). The transmission of communications during any particular symbols, slots, etc., as discussed in the present disclosure, may be provided to provide examples and are not intended to be limiting.

The initiating UE 602 may transmit a sidelink transmission in a portion of a COT 608 while leaving some gap durations for other UE's to transmit sidelink communications. The initiating UE 602 may support TDM COT sharing within the active transmission. For example, a UE 604 may share the COT 608 of the initiating UE 602 and transmit PSFCH to the initiating UE 602. In another example, a UE 606 may share the COT 608 of the initiating UE 602 and transmit PSCCH/PSSCH to the initiating UE 602. In some examples, the initiating UE 602 may transmit SCI including COT sharing information. The COT sharing information may indicate that other sidelink UEs can share the COT and/or time duration of the COT. In some examples, a monitoring UE may monitor for SCI, detect SCI, read the COT sharing information, and decide to use the COT if the monitoring UE has data to transmit.

The COT 608 may include three transmission slots, slot 0, slot 1, and slot 2, with each slot including fourteen symbols. In each of the slots, symbol 0 may be a repetition of symbol 1. Additionally, a portion of symbol 13 in slot 0 and in slot 1 may include a CP extension that controls a gap duration between the initiating UE 602's sidelink transmission and the responding UE's sidelink transmission such that the gap duration satisfies an LBT gap time threshold. The responding UE that is sharing the initiating UE 602's COT may be responsible for determining, based on a starting and/or ending point of the initiating UE 602's sidelink transmission 614, a duration of the shared COT 608, and/or a remainder of the duration of the shared COT 608 after the sidelink transmission 614, a length of the CP extension. In an example, the responding UE may determine the remainder duration of the shared COT 608 by determining a difference between the ending point of the initiating UE 602's sidelink transmission and the duration of the COT. In another example, the responding UE determines a length of the initiating UE 602's transmission based on the starting and ending points of the initiating UE 602's sidelink transmission and subtracts the length from the COT duration.

In an example, the UE 604 may detect the sidelink transmission 614 in the COT 608 shared by multiple UEs (e.g., the initiating UE 602, the UE 604, and/or the UE 606). The UE 604 may perform an LBT to contend for the shared COT 608. To reduce a gap duration such that it satisfies the LBT gap time threshold, the UE 604 may determine a CP extension length for transmitting a sidelink transmission and apply the CP extension having the length to a sidelink transmission. For example, the UE 604 may transmit a PSFCH transmission 616, which may include a sidelink ACK/NACK feedback in symbol 12 of slot 0, with the symbol 11 of slot 0 being a repetition of symbol 12 of slot 0, to the initiating UE 602. If the gap duration during symbol 10 of slot 0 satisfies the LBT gap time threshold, the UE 604 may perform a CAT2 LBT or a CAT1 LBT instead of a CAT4 LBT.

To transmit the PSFCH transmission 616 within the same slot (e.g., slot 0) and the same COT 608 as was used by the initiating UE 602 to transmit the sidelink transmission 614, the UE 604 may compute a length of the CP extension in accordance with equation (1):

$$\text{CP extension length} = T_{symbol} - \text{LBT Gap time threshold}, \quad (1)$$

where $T_{symbol}$ represents a symbol duration or symbol length. In an example, the LBT gap time threshold is 16 μs. The UE 604 may apply the CP extension having the CP extension length to the PSFCH transmission 616 and perform an LBT prior to the PSFCH transmission 616. For example, the UE 604 may perform an LBT (e.g., CAT2 LBT or CAT1 LBT) during a gap duration in symbol 10 in slot 0 created by the application of the CP extension. If the LBT is successful, the UE 604 may transmit the PSFCH transmission 616 with the CP extension. Accordingly, if the LBT gap time threshold is 16 μs and a responding UE (e.g., UE 604) shares a COT with an initiating UE (e.g., 602) and transmits PSFCH in the shared COT, the responding UE may determine a CP extension length of $T_{symbol}$—16 μs to generate a gap duration of 16 μs in the last symbol of the previous slot (e.g., the slot including the sidelink transmission 614 of the initiating UE 602). In an example, $T_{symbol}$ represents a symbol duration or symbol length of symbol 10 of slot 0.

In another example, the UE 606 may detect the sidelink transmission 614 in the COT 608 shared by multiple UEs (e.g., the initiating UE 602, the UE 604, and/or the UE 606). The COT 608 may be for sharing with the multiple sidelink UEs. The UE 606 may perform LBT to contend for the shared COT 608. To reduce a gap duration such that it satisfies the LBT gap time threshold, the UE 606 may determine a CP extension length for transmitting a sidelink transmission and apply the CP extension having the length to a sidelink transmission. For example, the UE 606 may transmit a PSCCH/PSSCH transmission 618, which may include a sidelink PSCCH/PSSCH transmission in symbols 1-12 of slot 1, with the symbol 0 of slot 1 being a repetition of symbol 1 of slot 1, to the initiating UE 602. If the gap duration during symbol 13 of slot 0 satisfies the LBT gap time threshold, the UE 606 may perform a CAT2 LBT or a CAT1 LBT instead of a CAT4 LBT.

To transmit the PSCCH/PSSCH transmission 618 within slot 1 during the shared COT 608, which was used by the initiating UE 602 to transmit the sidelink transmission 614, the UE 606 may compute a length of the CP extension in accordance with equation (2):

$$\text{CP extension length} = T_{symbol} - \text{LBT Gap time threshold}, \quad (2)$$

where $T_{symbol}$ represents a symbol duration or symbol length. In an example, the LBT gap time threshold is 16 μs. The UE 606 may apply the CP extension having the CP extension length to the PSCCH/PSSCH transmission 618 and perform an LBT prior to the PSCCH/PSSCH transmission 618. For example, the UE 606 may perform an LBT (e.g., CAT2 LBT or CAT1 LBT) during a gap duration of symbol 13 in slot 0. If the LBT is successful, the UE 606 may transmit the PSCCH/PSSCH transmission 618 with the CP extension. Accordingly, if the LBT gap time threshold is 16 μs and a responding UE (e.g., UE 606) shares a COT with an initiating UE (e.g., 602) and transmits PSCCH/PSSCH in a succeeding slot of the slot in which the initiating UE transmitted in, the responding UE may determine a CP extension length of $T_{symbol}$—16 μs to generate a gap duration of 16 μs in the last symbol of the previous slot (e.g., the slot including the sidelink transmission 614 of the initiating UE 602). In an example, $T_{symbol}$ represents a symbol duration or symbol length of symbol 13 of slot 0.

In another example, the initiating UE 602 may desire to transmit a sidelink PSCCH/PSSCH transmission 620 during the COT 608. The initiating UE 602 may perform LBT to contend for the shared COT 608. To reduce a gap duration such that it satisfies the LBT gap time threshold, the initiating UE 602 may determine a CP extension length for transmitting a sidelink transmission and apply the CP extension having the length to a sidelink transmission. For example, the initiating UE 602 may transmit a PSCCH/PSSCH transmission 620, which may include a sidelink PSCCH/PSSCH transmission in symbols 1-12 of slot 2, with the symbol 0 of slot 1 being a repetition of symbol 1 of slot 1, to another sidelink UE. If the gap duration within symbol 13 of slot 1 satisfies the LBT gap time threshold, the initiating UE 602 may perform a CAT2 LBT or a CAT1 LBT instead of a CAT4 LBT.

To transmit the PSCCH/PSSCH transmission 620 within slot 2 during the shared COT 608, which was used by the initiating UE 602 to transmit the sidelink transmission 614, the initiating UE 602 may compute a length of the CP extension in accordance with equation (3):

$$\text{CP extension length} = T_{symbol} - \text{LBT Gap time threshold}, \quad (3)$$

where $T_{symbol}$ represents a symbol duration or symbol length. In an example, the LBT gap time threshold is 16 μs. The initiating UE 602 may apply the CP extension having the CP extension length to the PSCCH/PSSCH transmission 620 and perform an LBT prior to the PSCCH/PSSCH transmission 620. For example, the initiating UE 602 may perform an LBT (e.g., CAT2 LBT or CAT1 LBT) during a gap duration of symbol 13 in slot 1. If the LBT is successful, the initiating UE 602 may transmit the PSCCH/PSSCH transmission 620 with the CP extension. Accordingly, if the LBT gap time threshold is 16 μs and the initiating UE 602 transmits PSCCH/PSSCH in a slot different from the first slot 0 in the shared COT 608, the initiating UE 606 may determine a CP extension length of $T_{symbol}$—16 μs to generate a gap duration of 16 μs in the last symbol of the previous slot (e.g., the slot including the PSCCH/PSSCH transmission 618 of the UE 606). In an example, $T_{symbol}$ represents a symbol duration or symbol length of symbol 13 of slot 1. The initiating UE 602's sidelink transmission (e.g., PSCCH/PSSCH transmission 620) may follow a transmission from the same UE of PSCCH/PSFCH, may follow a PSFCH from another UE, or follow a PSCCH/PSCCH from another UE (sharing the COT 608). Equation (3) may be used in any of these examples.

Figure 7:
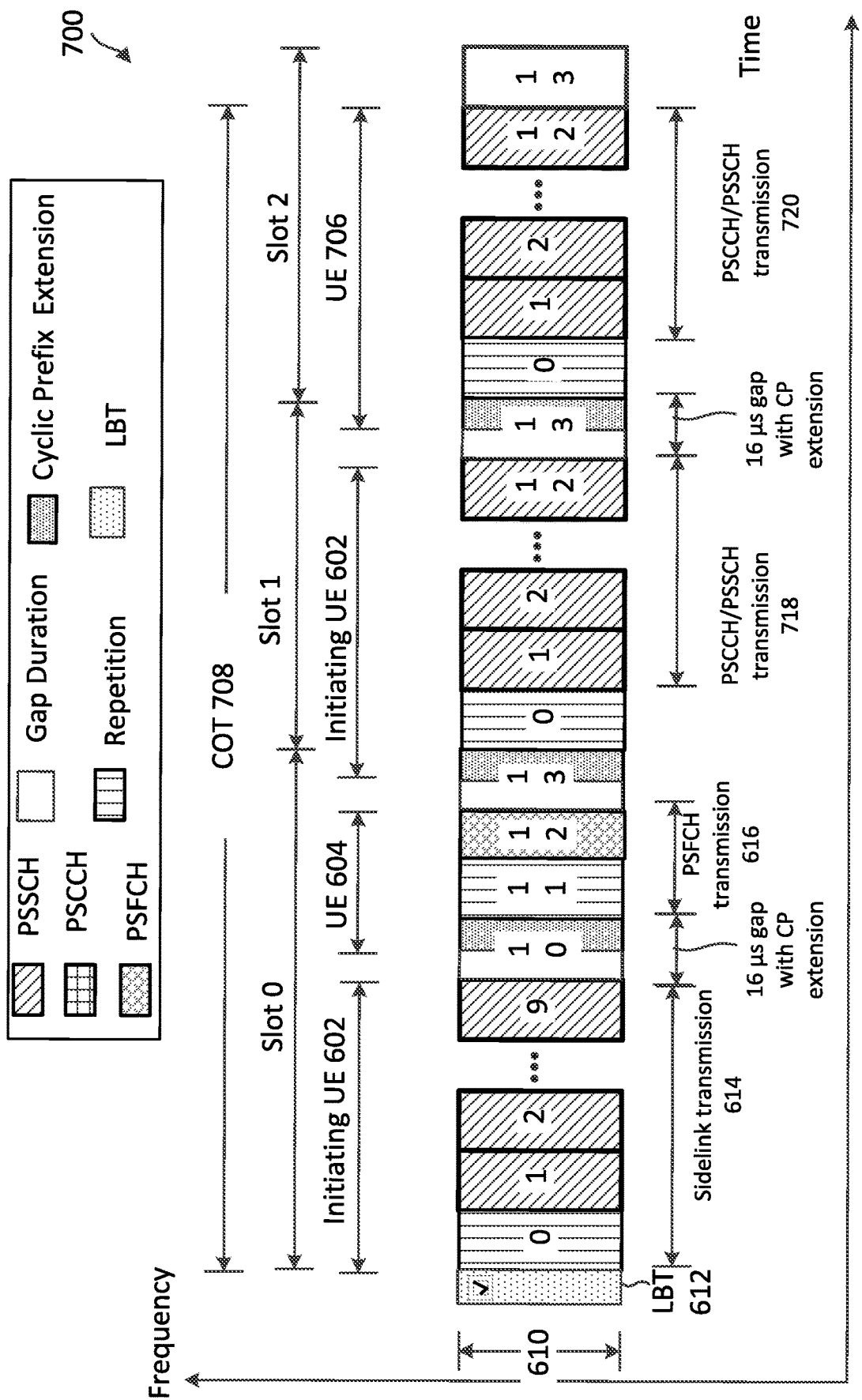
FIG. 7 illustrates an TDM sidelink COT sharing scheme with out-of-time span of initiating UE according to one or more aspects of the present disclosure.

FIG. 7 illustrates an TDM sidelink COT sharing scheme 700 with out-of-time span of initiating UE according to one or more aspects of the present disclosure. The scheme 700 provisions for COT sharing among sidelink UEs (e.g., the UEs 115, 215, 315, and/or 400) using TDM sidelink sharing. The scheme 700 is described using a similar TDM structure as in the scheme 200. The scheme 700 may be employed by an initiating UE 602, a UE 604, and a UE 706. The UE 602, 604, or 706 may correspond to a UE 115 in a network such as the network 100. In particular, any of the UEs 602, 604, or 706 may communicate with one or more other UEs over a sidelink. The x-axis represents time in some arbitrary units, and the y-axis represents frequency in some arbitrary units.

Aspects of the scheme 700 may overlap with aspects of the scheme 600 in FIG. 6. In the scheme 700, the initiating UE 602 (e.g., the UEs 115, 215, 315, and/or 400) may initiate or contend for a COT 708 in the frequency band 610 by performing the LBT 612 in the frequency band 610. The initiating UE 602 may transmit the sidelink transmission 614 in a portion of the COT 708 while leaving some gap durations for other UE's to transmit sidelink communications. The initiating UE 602 may support TDM COT sharing outside the active transmission. For example, a UE 604 may share the COT 708 of the initiating UE 602 and transmit PSFCH to the initiating UE 602. In another example, a UE 706 may share the COT 708 of the initiating UE 602 and transmit PSCCH/PSSCH to the initiating UE 602.

The COT 708 may include three transmission slots, slot 0, slot 1, and slot 2, with each slot including fourteen symbols. In each of the slots, symbol 0 may be a repetition of symbol 1. Additionally, a portion of symbol 13 in slot 0 and in slot 1 may include a CP extension that controls a gap duration between the initiating UE 602's sidelink transmission and the responding UE's sidelink transmission such that the gap duration satisfies an LBT gap time threshold. The responding UE that is sharing the initiating UE 602's COT may be responsible for determining, based on a starting and/or ending point of the initiating UE 602's sidelink transmission, a duration of the shared COT 708, and/or a remainder of the duration of the shared COT 708 after the initiating UE 602's sidelink transmission, a length of the CP extension. As discussed in relation to FIG. 6, the UE 604 may perform an LBT during the gap duration in symbol 10 of slot 0 and transmit the PSFCH transmission 616.

After the UE 604 transmits the PSFCH transmission 616, the initiating UE 602 may perform an LBT during a gap duration in symbol 13 of slot 0. If the LBT is successful, then the initiating UE 602 may transmit a PSCCH/PSSCH transmission 718 in symbol 1-12 of slot 1, with the symbol 0 of slot 1 being a repetition of symbol 1 of slot 1, to a sidelink UE.

In an example, the UE 706 may detect the sidelink transmission (e.g., PSCCH/PSSCH transmission 718) in the COT 708 shared by multiple UEs (e.g., the initiating UE 602, the UE 604, and/or the UE 706). The UE 706 may perform an LBT to contend for the shared COT 708. To reduce a gap duration such that it satisfies the LBT gap time threshold, the UE 706 may determine a CP extension length for transmitting a sidelink transmission and apply the CP extension having the length to a sidelink transmission. For example, the UE 706 may transmit a PSCCH/PSSCH transmission 720 in symbols 1-12 of slot 2, with the symbol 0 of slot 2 being a repetition of symbol 1 of slot 2, to the initiating UE 602. If the gap duration during symbol 13 of slot 1 satisfies the LBT gap time threshold, the UE 706 may perform a CAT2 LBT or a CAT1 LBT instead of a CAT4 LBT.

To transmit the PSCCH/PSSCH transmission 720 within slot 2 during the shared COT 708, which was used by the initiating UE 602 to transmit the sidelink (e.g., PSCCH/PSSCH) transmission 714, the UE 706 may compute a length of the CP extension in accordance with equation (4):

$$\text{CP extension length} = T_{symbol} - \text{LBT Gap time threshold}, \quad (4)$$

where $T_{symbol}$ represents a symbol duration or symbol length. In an example, the LBT gap time threshold is 16 μs. The UE 706 may apply the CP extension having the CP extension length to the PSCCH/PSSCH transmission 720 and perform an LBT prior to the PSCCH/PSSCH transmission 720. For example, the UE 706 may perform an LBT (e.g., CAT2 LBT or CAT1 LBT) during a gap duration of symbol 13 in slot 1. If the LBT is successful, the UE 706 may transmit the PSCCH/PSSCH transmission 720 with the CP extension. In this example, the responding UE 706 may generate a gap duration of 16 μs in the last symbol of the previous slot (e.g., the slot including the sidelink transmission 718 of the initiating UE 602). In an example, $T_{symbol}$ represents a symbol duration or symbol length of symbol 13 of slot 1. In some examples, if the UE 706 intends to transmit a transmission with a transmission length or duration that is short limited (e.g., up to 0.584 milliseconds), the UE 706 may transmit the transmission without performing an LBT.

Figure 8:
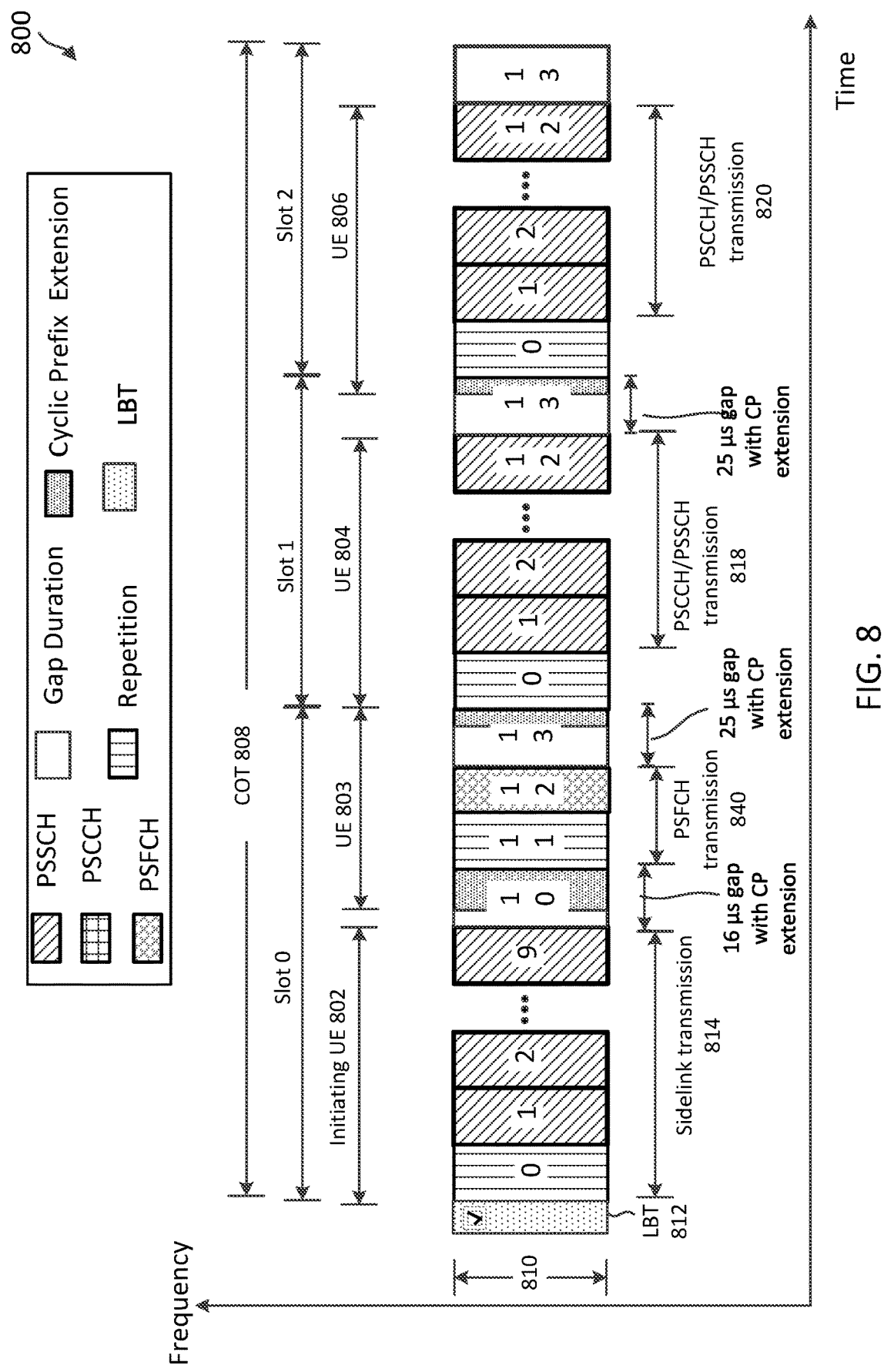
FIG. 8 illustrates a TDM sidelink COT sharing scheme with out-of-time span of initiating UE in accordance with one or more aspects of the present disclosure.

FIG. 8 illustrates a TDM sidelink COT sharing scheme 800 with out-of-time span of initiating UE in accordance with one or more aspects of the present disclosure. The scheme 800 provisions for COT sharing among sidelink UEs (e.g., the UEs 115, 215, 315, and/or 400) using TDM sidelink sharing. The scheme 800 is described using a similar TDM structure as in the scheme 200. The scheme 800 may be employed by an initiating UE 802, a UE 803, a UE 804, and a UE 806. The UEs 802, 803, 804, or 806 may correspond to a UE 115 in a network such as the network 100. In particular, any of the UEs 802, 803, 804, or 806 may communicate with one or more other UEs over a sidelink. The x-axis represents time in some arbitrary units, and the y-axis represents frequency in some arbitrary units.

In the scheme 800, an initiating UE 802 (e.g., the UEs 115, 215, 315, and/or 400) may initiate or contend for a COT 808 in a frequency band 810 by performing an LBT 812 in the frequency band 810. The LBT 812 may be a CAT4 LBT similar to the LBT 230 in FIG. 2. The LBT 812 is a pass as shown by the checkmark indicating that the UE 802 acquired the COT 808. The COT 808 may include three transmission slots, slot 0, slot 1, and slot 2, with each slot including fourteen symbols. In each of the slots, symbol 0 may be a repetition of symbol 1. Additionally, a portion of symbol 13 in slot 0 and in slot 1 may include a CP extension that controls a gap duration between the initiating UE 802's sidelink transmission and the responding UE's sidelink transmission such that the gap duration satisfies an LBT gap time threshold. The responding UE that is sharing the initiating UE 802's COT may be responsible for determining, based on a starting and/or ending point of the initiating UE 802's sidelink transmission, a duration of the shared COT 808, and/or a remainder of the duration of the shared COT 808 after the initiating UE 802's sidelink transmission, a length of the CP extension.

After acquiring the COT 808, the UE 802 may transmit a sidelink communication 814 to a second sidelink UE (e.g., UE 803, UE 804, UE 806, or other UE) during the symbols 1-9 in slot 0 of the COT 808. The initiating UE 802 may transmit the sidelink transmission 814 in a portion of the COT 808 while leaving some gap durations for other UE's to transmit sidelink communications. The initiating UE 802 may support TDM COT sharing outside the active transmission. For example, a UE 803 may share the COT 808 of the initiating UE 802 and transmit a PSFCH transmission 840 to the initiating UE 802 in slot 0 of the COT. In another example, a UE 804 may share the COT 808 of the initiating UE 802 and transmit a PSSCH/PSSCH transmission 818 to the initiating UE 802 in slot 1 of the COT. In another example, a UE 806 may share the COT 808 of the initiating UE 802 and transmit a PSCCH/PSSCH transmission 820 to the initiating UE 802 in slot 2 of the COT The UE 803 may perform an LBT during the gap duration in symbol 10 of slot 0 and transmit the PSFCH transmission 840. The UE 803 may generate a gap duration of 16 µs in the symbol 10 in slot 0 of COT 808 and perform LBT during the gap duration. The UE 803 may determine a CP extension length for transmitting the PSFCH transmission 840, with the LBT gap time threshold being 16 µs, and apply a CP extension having the CP extension length to the PSFCH transmission 840. The UE 803 may transmit the PSFCH transmission 840 during the symbol 12 of the slot 0 in the COT 808, with the symbol 11 being a repetition of symbol 12, to the initiating UE 802.

Additionally, the scheme 800 may apply to SCS of 15 KHz or 30 KHz in a scenario in which a sidelink transmission by the initiating UE does not immediately precede a sidelink transmission by a responding UE (e.g., UE 804 or 806). For example, the initiating UE 802's sidelink transmission 814 immediately precedes the UE 803's PSFCH transmission 840 because no other UE has transmitted between the initiating UE 802's sidelink transmission 814 and the 803's PSFCH transmission 840. Conversely, the initiating UE 802's sidelink transmission 814 does not immediately precede the UE 804's PSCCH/PSSCH transmission 818 because the UE 803 has transmitted a sidelink communication (e.g., PSFCH transmission 840) between the initiating UE 802's sidelink transmission 814 and the UE 804's PSCCH/PSSCH transmission 818. Similarly, the initiating UE 802's sidelink transmission 814 does not immediately precede the UE 806's PSCCH/PSSCH transmission 820 because the UE 803 has transmitted a sidelink communication (e.g., PSFCH transmission 840) between the initiating UE 802's sidelink transmission 814 and the UE 806's PSCCH/PSSCH transmission 820.

If a responding UE 804, 806 does not transmit a sidelink transmission immediately after the initiating UE 802, then the responding UE 804, 806 may perform an LBT during a gap duration to access the channel with a CP extension of $T_{symbol}$—25 µs to generate a gap duration of 25 µs in the last symbol (e.g., symbol 13) in the previous slot. If the LBT is successful, the UE 804 shares the COT 808 of the initiating UE 802 and transmits the PSCCH/PSSCH transmission 818 in slot 1 in the COT 808. Similarly, if the LBT is successful, the UE 806 shares the COT 808 of the initiating UE 802 and transmits the PSCCH/PSSCH transmission 820 in slot 2 in the COT 808.

Figure 9:
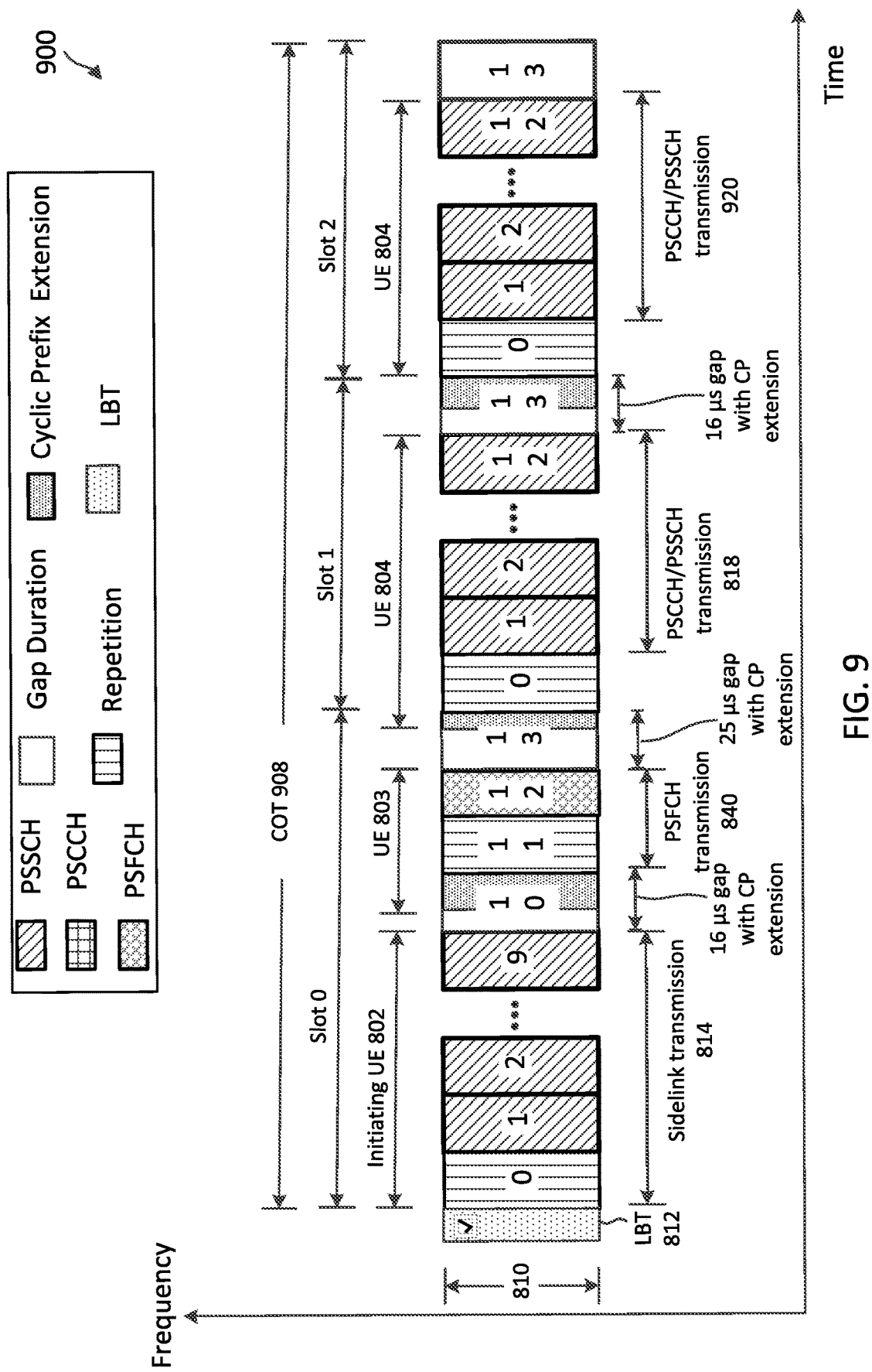
FIG. 9 illustrates a TDM sidelink COT sharing scheme with out-of-time span of initiating UE in accordance with one or more aspects of the present disclosure.

FIG. 9 illustrates a TDM sidelink COT sharing scheme 900 with out-of-time span of initiating UE in accordance with one or more aspects of the present disclosure. The scheme 900 provisions for COT sharing among sidelink UEs (e.g., the UEs 115, 215, 315, and/or 400) using TDM sidelink sharing. The scheme 900 is described using a similar TDM structure as in the scheme 200. The scheme 900 may be employed by the initiating UE 802 and the initiating UE 804. The x-axis represents time in some arbitrary units, and the y-axis represents frequency in some arbitrary units. Additionally, the scheme 900 may apply to SCS of 15 KHz or 30 KHz in a scenario in which a responding UE transmits in multiple continuous slots.

Similar to the scheme 800 in FIG. 8, in the scheme 900, the initiating UE 802 may acquire a COT 908 including three transmission slots, slot 0, slot 1, and slot 2, with each slot including fourteen symbols. In each of the slots, symbol 0 may be a repetition of symbol 1. Additionally, the UE 803 may perform an LBT during a gap duration of 16 µs in symbol 10 in slot 0 of the COT 908 to access the channel with a CP extension of $T_{symbol}$—16 The UE 804 may perform an LBT during a gap duration of 25 µs in last symbol (e.g., symbol 13) in slot 0 of the COT 908 to access the channel with a CP extension of $T_{symbol}$—25 µs. Based on successful LBTs, the initiating UE 802 (e.g., the UEs 115, 215, 315, and/or 400) transmits the sidelink transmission 804, the UE 803 (e.g., the UEs 115, 215, 315, and/or 400) transmits the PSFCH transmission 840, and the UE 804 (e.g., the UEs 115, 215, 315, and/or 400) transmits the PSCCH/PSSCH transmission 818.

In the scheme 900, if the UE 804 transmits in multiple continuous slots, for slots other than the first slot in the COT 908 (e.g., slot 0 in the COT 908), the UE 804 may use a CP extension length of $T_{symbol}$—16 µs to generate a gap of 16 µs in the last symbol (e.g., symbol 13) in the previous slot (e.g., the slot in which the PSCCH/PSSCH transmission 818 was transmitted in slot 1 by itself). A portion of symbol 13 in slot 1 in the COT 908 may include a CP extension that controls a gap duration between the UE 804's sidelink transmission (e.g., PSCCH/PSSCH transmission 818) and the UE 804's sidelink transmission (e.g., PSCCH/PSSCH transmission 920), which are transmitted in continuous slots by the same UE, such that the gap duration satisfies an LBT gap time threshold. If the LBT is successful, the UE 804 transmits the PSCCH/PSSCH transmission 920 during the COT 908.

In some examples, if the gap duration is shorter than a critical threshold compared to another UE attempting to share the COT within the initiating UE, then the CP extension may stop the other UE from sharing the COT. Accordingly, a collision may be avoided. In an example, the critical threshold may be about 9 µs.

Figure 10:
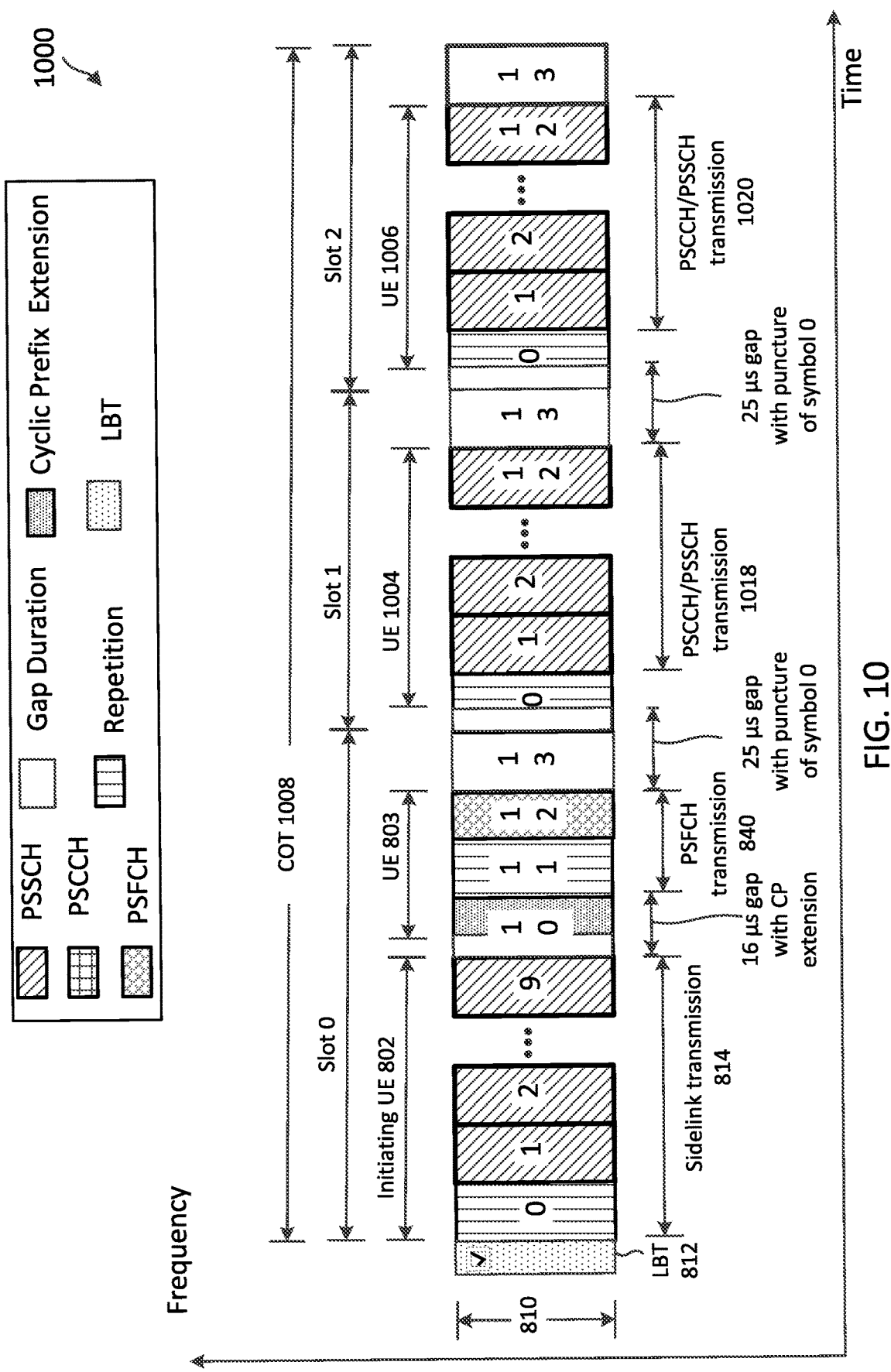
FIG. 10 illustrates a TDM sidelink COT sharing scheme with out-of-time span of initiating UE in accordance with one or more aspects of the present disclosure.
Figure 11:
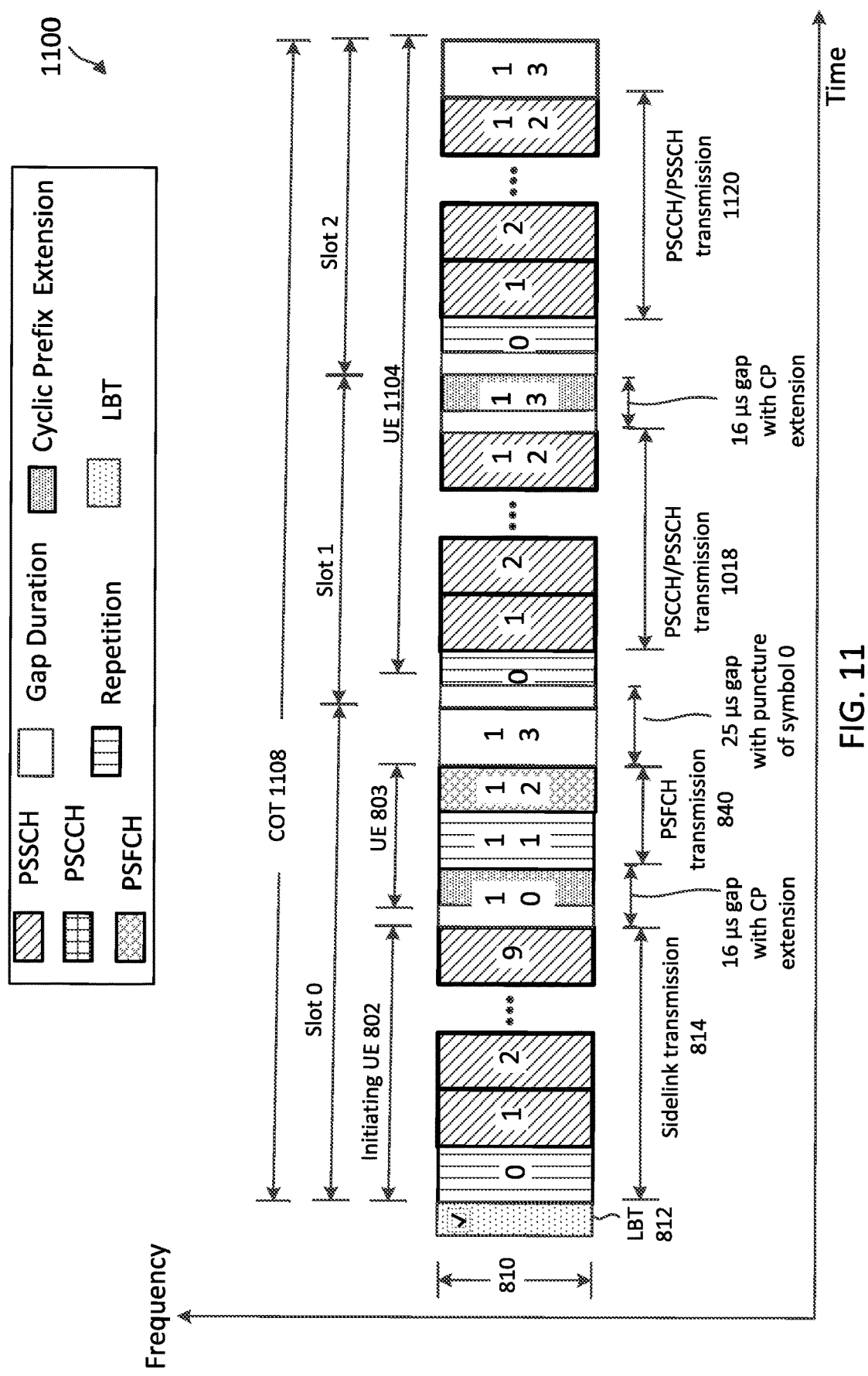
FIG. 11 illustrates a TDM sidelink COT sharing scheme with out-of-time span of initiating UE in accordance with one or more aspects of the present disclosure.

In the examples illustrated in FIGS. 8 and 9, the schemes 800 and 900 corresponded to SCS of about 15 KHz or about 30 KHz, which provide for symbol lengths that are greater than 25 µs. In FIGS. 10 and 11, the schemes 1000 and 1100 correspond to SCS of about 60 KHz, which provides for symbol lengths that are less than 25 µs. Accordingly, it may not be possible for a responding UE to create a 25 µs gap using a CP extension. In this example, the responding UE may use the full symbol gap in the last symbol and puncture part of symbol 0 as well (which is a repetition of symbol 1) in a slot.

FIG. 10 illustrates a TDM sidelink COT sharing scheme 1000 with out-of-time span of initiating UE in accordance with one or more aspects of the present disclosure. The scheme 1000 provisions for COT sharing among sidelink UEs (e.g., the UEs 115, 215, 315, and/or 400) using TDM sidelink sharing. The scheme 1000 is described using a similar TDM structure as in the scheme 200. The scheme 1000 may be employed by an initiating UE 802, a UE 803, a UE 1004, and a UE 1006. The UEs 802, 803, 1004, or 1006 may correspond to a UE 115 in a network such as the network 100. In particular, any of the UEs 802, 803, 1004, or 1006 may communicate with one or more other UEs over a sidelink. The x-axis represents time in some arbitrary units, and the y-axis represents frequency in some arbitrary units.

Aspects of the scheme 800 in FIG. 8 may correspond to aspects of the scheme 1000. For example, the initiating UE 802 (e.g., the UEs 115, 215, 315, and/or 400) may initiate or contend for a COT 1008 in the frequency band 810 by performing the LBT 812 in the frequency band 810. The LBT 812 may be a CAT4 LBT similar to the LBT 230 in FIG. 2. The LBT 812 is a pass as shown by the checkmark indicating that the UE 802 acquired the COT 1008. The COT 1008 may include three transmission slots, slot 0, slot 1, and slot 2, with each slot including fourteen symbols. In slot 0, symbol 0 may be a repetition of symbol 1. As discussed in relation to FIG. 8, the UE 802 transmits the sidelink transmission 814, and the UE 803 transmits the PSFCH transmission 840.

The initiating UE 802 may transmit the sidelink transmission 814 in a portion of the COT 1008 while leaving some gap durations for other UE's to transmit sidelink communications. The initiating UE 802 may support TDM COT sharing outside the active transmission. For example, UE 1004 may share the COT 1008 of the initiating UE 802 and transmit a PSSCH/PSSCH transmission 1018 to the initiating UE 802 in slot 1 of the COT. In another example, a UE 1006 may share the COT 1008 of the initiating UE 802 and transmit a PSCCH/PSSCH transmission 1020 to the initiating UE 802 in slot 2 of the COT.

As discussed, the scheme 1000 may apply to SCS of about 60 KHz in a scenario in which a sidelink transmission by the initiating UE does not immediately precede a sidelink transmission by a responding UE (e.g., UE 1004 or 1006). For example, the initiating UE 802's sidelink transmission 814 immediately precedes the UE 803's PSFCH transmission 840 because no other UE has transmitted between the initiating UE 802's sidelink transmission 814 and the 803's PSFCH transmission 840. Conversely, the initiating UE 802's sidelink transmission 814 does not immediately precede the UE 1004's PSCCH/PSSCH transmission 1018 because the UE 803 has transmitted a sidelink communication (e.g., PSFCH transmission 840) between the initiating UE 802's sidelink transmission 814 and the UE 1004's PSCCH/PSSCH transmission 1018. Similarly, the initiating UE 802's sidelink transmission 814 does not immediately precede the UE 1006's PSCCH/PSSCH transmission 1020 because the UE 803 has transmitted a sidelink communication (e.g., PSFCH transmission 840) between the initiating UE 802's sidelink transmission 814 and the UE 1006's PSCCH/PSSCH transmission 1020.

If the SCS of about 60 KHz, the symbol length may be shorter than 25 μs. Accordingly, the responding UE 1004 may maintain the gap duration in symbol 13 in slot 0 in COT 1008 and puncture symbol 0 in the next slot (e.g., slot 1) in the COT 1008 to extend the gap duration to the punctured symbol. For example, the UE 1004 may use a 25 μs LBT to access the channel with a puncturing of symbol 0 by extension of 25 μs—$T_{symbol}$ to generate a gap of 25 μs in the last symbol in the previous slot (e.g., slot 0) and the first symbol (e.g., symbol 0) in a current slot (e.g., the slot 1). In other words, rather than apply a CP extension as discussed in relation to FIG. 8 or FIG. 9, the UE 1004 may puncture symbol 0 in slot 1 to generate the gap duration of 25 μs by combining the gap duration in symbol 13 of the previous slot 0 and part of symbol 0 in slot 1. The UE 1004 may perform LBT during the 25 μs gap duration. If the LBT is successful, the UE 1004 may transmit the PSCCH/PSSCH transmission 1018 during symbols 1-12 in slot 1 during the COT 1008. Additionally, the UE 1004 may transmit a portion of a repetition of symbol 1 in symbol 0 in the slot 1.

The UE 1006 may perform similar actions as those discussed in relation to 1004 to transmit a PSCCH/PSSCH transmission 1020 in slot 2 during the COT 1008. For example, the UE 1006 may use a 25 μs LBT to access the channel with a puncturing of symbol 0 by extension of 25 μs—$T_{symbol}$ to generate a gap of 25 μs in the last symbol in the previous slot (e.g., slot 1) and the first symbol (e.g., symbol 0) in a current slot (e.g., the slot 2). The UE 1006 may perform LBT during the 25 μs gap duration. If the LBT is successful, the UE 1006 may transmit the PSCCH/PSSCH transmission 1020 during symbols 1-12 in slot 2 during the COT 1008. Additionally, the UE 1006 may transmit a portion of a repetition of symbol 1 in symbol 0 in the slot 2.

FIG. 11 illustrates a TDM sidelink COT sharing scheme 1100 with out-of-time span of initiating UE in accordance with one or more aspects of the present disclosure. The scheme 1100 provisions for COT sharing among sidelink UEs (e.g., the UEs 115, 215, 315, and/or 400) using TDM sidelink sharing. The scheme 1100 is described using a similar TDM structure as in the scheme 200. The scheme 1100 may be employed by the initiating UE 802, the UE 803, and the UE 1104. The x-axis represents time in some arbitrary units, and the y-axis represents frequency in some arbitrary units.

Similar to the scheme 900 in FIG. 9, in the scheme 1100, the initiating UE 802 may acquire a COT 1108 including three transmission slots, slot 0, slot 1, and slot 2, with each slot including fourteen symbols. In slot 0, symbol 0 may be a repetition of symbol 1. Additionally, the UE 803 may perform an LBT during a gap duration of 16 μs in symbol 10 in slot 0 of the COT 1108 to access the channel with a CP extension of $T_{symbol}$—16 μs.

If the SCS of about 60 KHz, the symbol length may be shorter than 25 μs. Similar to the scheme 1000 in FIG. 10, in the scheme 1100, a UE 1104 may maintain the gap duration in symbol 13 in slot 0 in COT 1108 and puncture symbol 0 in the next slot (e.g., slot 1) in the COT 1108 to extend the gap duration to the punctured symbol. For example, the UE 1104 may use a 25 μs LBT to access the channel with a puncturing of symbol 0 by extension of 25 μs—$T_{symbol}$ to generate a gap of 25 μs in the last symbol in the previous slot (e.g., slot 0) and the first symbol (e.g., symbol 0) in a current slot (e.g., the slot 1). In other words, rather than apply a CP extension as discussed in relation to FIG. 8 or FIG. 9, the UE 1104 may puncture symbol 0 in slot 1 to generate the gap duration of 25 μs by combining the gap duration in symbol 13 of the previous slot 0 and part of symbol 0 in slot 1. The UE 1104 may perform LBT during the 25 μs gap duration. If the LBT is successful, the UE 1104 may transmit the PSCCH/PSSCH transmission 1018 during symbols 1-12 in slot 1 during the COT 1108. Additionally, the UE 1104 may transmit a portion of a repetition of symbol 1 in symbol 0 in the slot 1.

In the scheme 1100, if the UE 1104 transmits in multiple continuous slots, for slots other than the first slot in the COT 1108 (e.g., slot 0 in the COT 1108), the UE 1104 may use a CP extension length of $T_{symbol}$—16 μs to generate a gap of 16 μs in the last symbol (e.g., symbol 13) in the previous slot (e.g., the slot in which the PSCCH/PSSCH transmission 1018 was transmitted in slot 1 by itself). A portion of symbol 13 in slot 1 in the COT 1108 may include a CP extension that controls a gap duration between the UE 1104's sidelink transmission (e.g., PSCCH/PSSCH transmission 1018) and the UE 1004's sidelink transmission (e.g., PSCCH/PSSCH transmission 1120), which are transmitted in continuous slots by the same UE, such that the gap duration satisfies an LBT gap time threshold. If the LBT is successful, the UE 1104 transmits the PSCCH/PSSCH transmission 1120 during the COT 1108.

In some examples, if the gap duration is shorter than a critical threshold compared to another UE attempting to share the COT within the initiating UE, then the CP extension may stop the other UE from sharing the COT. Accordingly, a collision may be avoided. In an example, the critical threshold may be about 11 μs.

Figure 12:
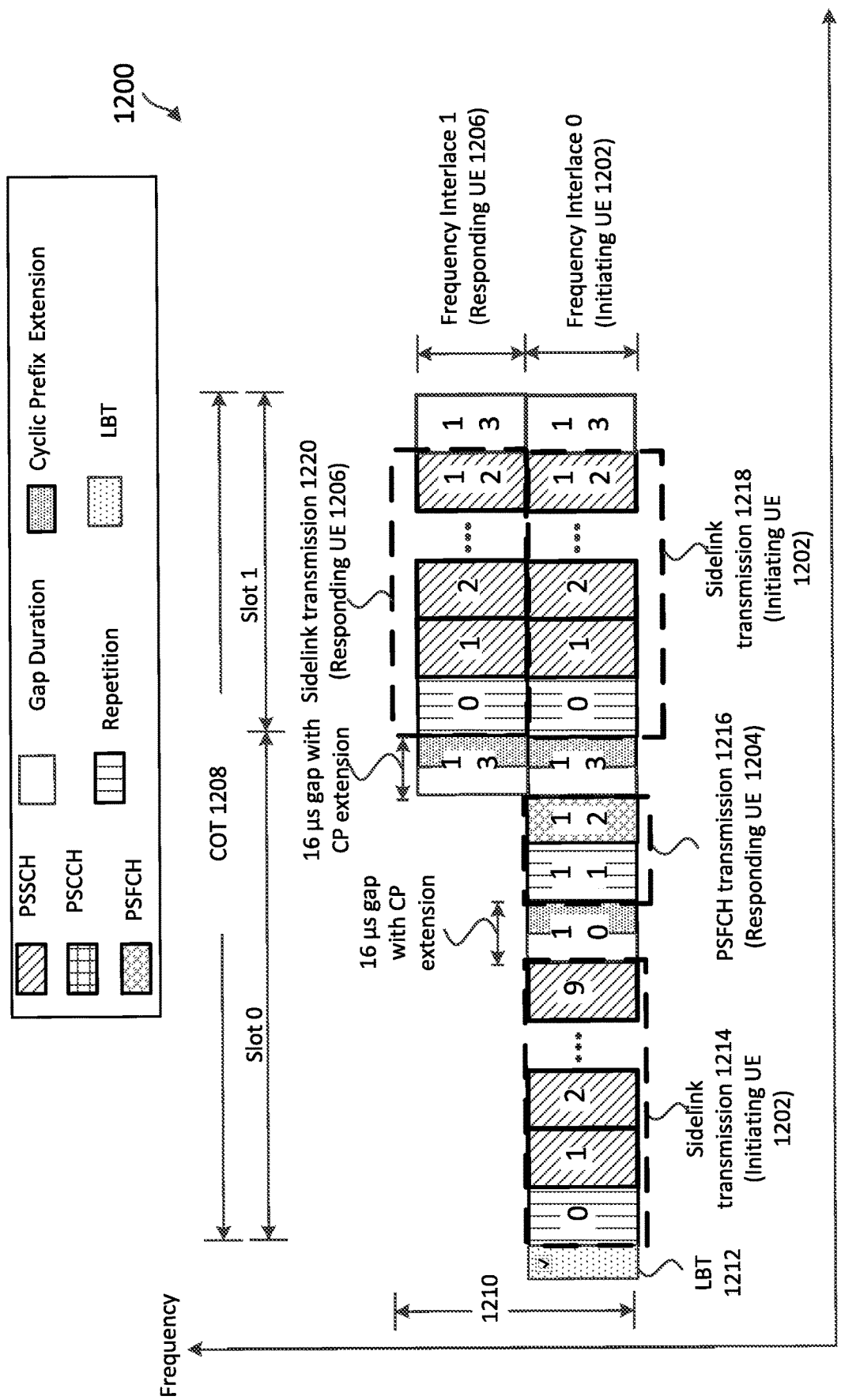
FIG. 12 illustrates an FDM sidelink COT sharing scheme with a cyclic prefix (CP) extension according to one or more aspects of the present disclosure.

FIG. 12 illustrates an FDM sidelink COT sharing scheme 1200 with a CP extension according to one or more aspects of the present disclosure. The scheme 1200 provisions for COT sharing among sidelink UEs (e.g., the UEs 115, 215, 315, and/or 400) using FDM sidelink sharing. The scheme 1200 is described using a similar FDM structure as in the scheme 300. The scheme 1200 may be employed by an initiating UE 1202, a UE 1204, and a UE 1206. The UE 1202, 1204, or 1206 may correspond to a UE 115 in a network such as the network 100. In particular, any of the UEs 1202, 1204, or 1206 may communicate with one or more other UEs over a sidelink. The x-axis represents time in some arbitrary units, and the y-axis represents frequency in some arbitrary units.

In the scheme 1200, an initiating UE 1202 (e.g., the UEs 115, 215, 315, and/or 400) may initiate or contend for a COT 1208 in a frequency band 1210 by performing an LBT 1212 in the frequency band 1210. The LBT 1212 may be a CAT4 LBT similar to the LBT 330 in FIG. 3. The LBT 1212 is a pass as shown by the checkmark indicating that the UE 1202 acquired the COT 1208. After acquiring the COT 1208, the UE 1202 may transmit a sidelink communication 1214 to a UE 1204 during the symbols 1-9 of slot 0 in a frequency interlace 0. The initiating UE 1202 may transmit a sidelink transmission 1214 in a portion of the COT 1208 while leaving some frequency interlaces for other UE's to transmit sidelink communications. The initiating UE 1202 may support FDM COT sharing with CP extension.

The frequency band 1210 may include one or more frequency interlaces. Although two frequency interlaces (e.g., frequency interlace 0 and frequency interlace 1) are shown, it should be understood that the frequency band 1210 may include more than two frequency interlaces. The UEs 1204 and 1206 may monitor for SCI carrying COT sharing information indicating one or more frequency interlaces used by and/or not used by the initiating UE 1202 during the COT 1208.

A UE 1204 may detect the sidelink transmission 1214 in the COT 1208 shared by multiple sidelink UEs including the UE 1204. The UE 1204 may determine a CP extension length for transmitting a PSFCH transmission 1216 after the sidelink transmission 1214, where a gap duration between the sidelink transmission 1214 and the PSFCH transmission 1216 satisfies an LBT gap time threshold. In an example, the LBT gap time threshold is 16 µs. The UE 1204 may determine CP extension length of $T_{symbol}$—16 µs to generate a gap duration of 16 µs in symbol 10 in slot 0 of COT 1208. In an example, $T_{symbol}$ represents a symbol duration or symbol length of symbol 10 in slot 0. The UE 1204 may apply the CP extension having the CP extension length to the PSFCH transmission 1216 and perform an LBT prior to the PSFCH transmission 1216. For example, the UE 1204 may perform an LBT (e.g., CAT2 LBT or CAT1 LBT) during a gap duration of symbol 10 in slot 0 in frequency interlace 0. If the LBT is successful, the UE 1204 may transmit the PSFCH transmission 1216 with the CP extension.

The initiating UE 1202 may perform similar actions as discussed in relation to UE 1204 to perform an LBT during a gap duration of 16 µs in symbol 13 in slot 0 of COT 1208. If the LBT is successful, the initiating UE 1202 may transmit a sidelink transmission 1218 in symbols 1-12 in frequency interlace 0 in a slot 1 during the COT 1208.

The UE 1206 may detect the sidelink transmission 1216 in the COT 1208 shared by multiple sidelink UEs including the UE 1206. The UE 1206 may determine a CP extension length for transmitting a sidelink transmission 1220 (e.g., PSSCH/PSCCH transmission) in the frequency interlace 1 during the COT 1208, where a gap duration between the sidelink transmission 1216 and the sidelink transmission 1220 satisfies an LBT gap time threshold. In an example, the LBT gap time threshold is 16 µs. The UE 1206 may determine CP extension length of $T_{symbol}$—16 µs to generate a gap duration of 16 µs in symbol 10 in slot 1 in the frequency interlace 1 of COT 1208. In an example, $T_{symbol}$ represents a symbol duration or symbol length of symbol 13 in slot 0. The UE 1206 may apply the CP extension having the CP extension length to the sidelink transmission 1220 and perform an LBT prior to the sidelink transmission 1220. For example, the UE 1206 may perform an LBT (e.g., CAT2 LBT or CAT1 LBT) during a gap duration of symbol 13 in slot 0 in frequency interlace 1. If the LBT is successful, the UE 1206 may transmit the sidelink transmission 1220 with the CP extension in the frequency interlace 1.

The initiating UE 1202 may stop its sidelink transmission temporarily to avoid blocking the other UEs' (e.g., UE 1204 or UE 1206) CAT2 LBTs. It may be desirable for the initiating UE 1202 to not stop for too long (e.g., longer than 16 µs), or the COT 1208 is surrendered by the UE 1202 (e.g., based on channel occupancy requirements). In an example, the initiating UE 1202 may resume transmission using the CP extension of $T_{symbol}$—16 µs for the symbol 13 in slot 0. In this example, the UE 1202 may perform a CAT1 LBT to resume sidelink transmissions in frequency interlace 0 in the COT 1208.

In some examples, if the LBT gap time threshold is 16 µs, the initiating UE 602 may use a CP extension length of $T_{symbol}$—16 µs for a first symbol to generate a gap duration of 16 µs in the last symbol of the previous slot (e.g., the slot including the sidelink transmission 1218 of the initiating UE 1202) and may perform a CAT2 LBT (e.g., 16 µs) before transmitting the CP extension in symbol 13 of slot 0. In an example, $T_{symbol}$ represents a symbol duration or symbol length of symbol 13 of slot 0. The initiating UE 1202 may apply the CP extension having the CP extension length to the sidelink transmission 1218 and perform an LBT prior to the sidelink transmission 1218. If the LBT is successful, the UE 1202 may transmit the sidelink transmission 1218 with the CP extension in the frequency interlace 0.

Figure 13:
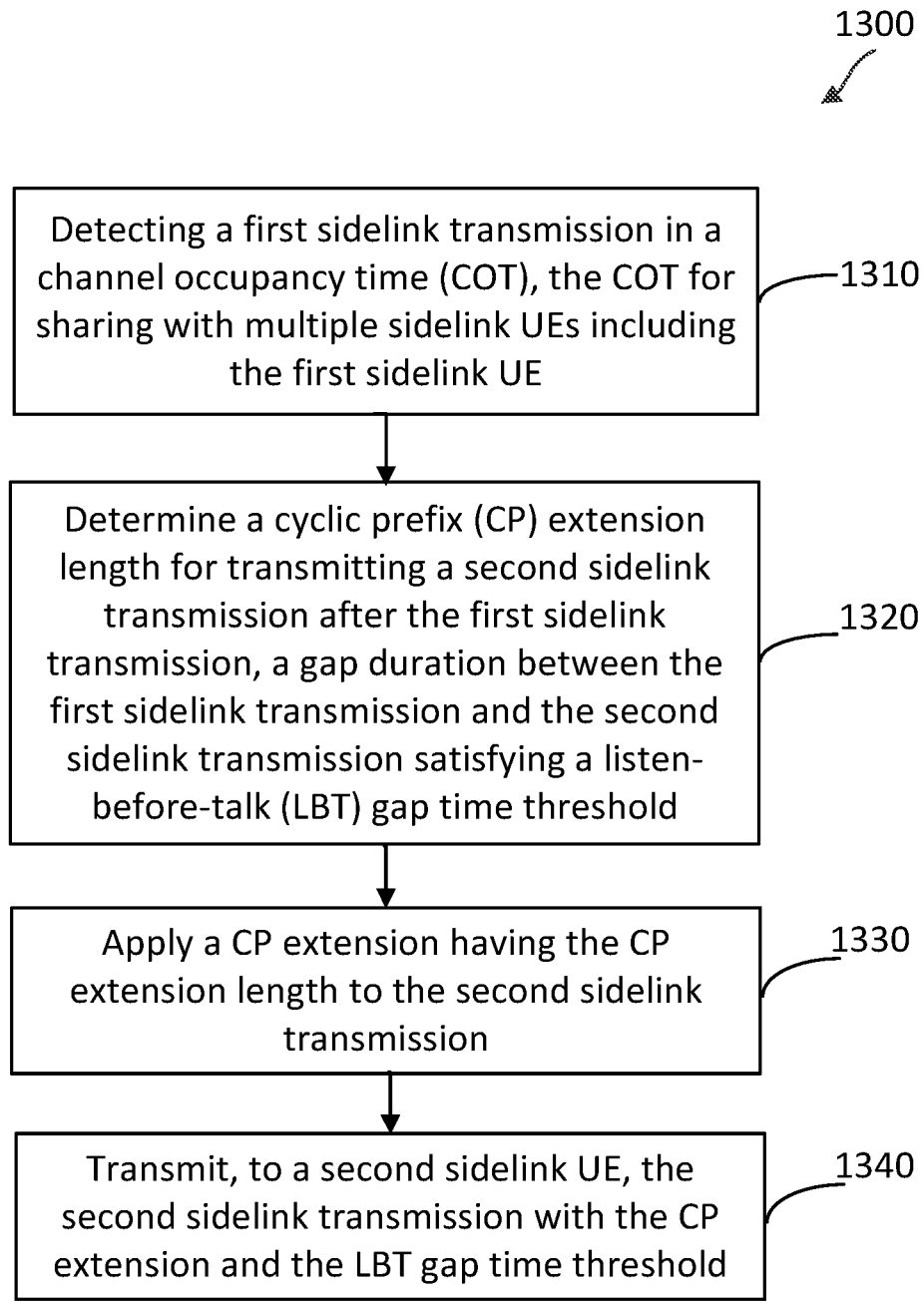
FIG. 13 illustrates a flow diagram of a communication method for transmitting a sidelink communication associated with a CP extension during a shared COT in accordance with one or more aspects of the present disclosure.

FIG. 13 illustrates a flow diagram of a communication method 1300 for transmitting a sidelink communication associated with a CP extension during a shared COT in accordance with one or more aspects of the present disclosure. Blocks of the method 1300 can be executed by a computing device (e.g., a processor, processing circuit, and/or other suitable component) of a wireless communication device. In some aspects, the wireless communication device is a UE (e.g., UEs 115, 215, 315, and/or UE 400) that may utilize one or more components, such as the processor 402, the memory 404, the COT sharing module 408, the sidelink communication module 409, the transceiver 410, and/or the antennas 416 to execute the blocks of the method 1300. The method 1300 may employ similar aspects as in the scheme 200 in FIG. 2, the scheme 300 in FIG. 3, the scheme 500 in FIG. 5, the scheme 600 in FIG. 6, the scheme 700 in FIG. 7, the scheme 800 in FIG. 8, the scheme 900 in FIG. 9, the scheme 1000 in FIG. 10, the scheme 1100 in FIG. 11, and/or the scheme 1200 in FIG. 2. As illustrated, the method 1300 includes a number of enumerated blocks, but aspects of the method 1300 may include additional blocks before, after, and/or in between the enumerated blocks. In some aspects, one or more of the enumerated blocks may be omitted or performed in a different order.

At block 1310, the method 1300 includes detecting a first sidelink transmission in a channel occupancy time (COT), the COT for sharing with multiple sidelink UEs including a first sidelink UE. In some examples, the first sidelink UE may detect the first sidelink transmission in the COT. The first sidelink UE may detect the first sidelink transmission by monitoring for SCI indicating COT sharing information on the COT. The first sidelink transmission may include the SCI.

At block 1320, the method 1300 includes determining a cyclic prefix (CP) extension length for transmitting a second sidelink transmission after the first sidelink transmission, a gap duration between the first sidelink transmission and the second sidelink transmission satisfying a listen-before-talk (LBT) gap time threshold. In some examples, the first sidelink UE may determine the CP extension length. In an example, the LBT gap time threshold is 16 microseconds (as just one example of a numeric value). In another example, the LBT gap time threshold is 16 microseconds (as just one example of another numeric value).

At block 1330, the method 1300 includes applying a CP extension having the CP extension length to the second sidelink transmission. In some examples, the first sidelink UE may apply the CP extension having the CP extension length to the second sidelink transmission. In an example, to apply a CP extension to a signal including symbols 0 to K, the first sidelink UE may generate the CP extension and attach the CP extension to a beginning of the signal. For example, if the signal includes symbols 0 to K, the first sidelink UE may generate the CP extension by copying an ending portion of symbol 0. After generating the CP extension, the first sidelink UE may attach the CP extension to the beginning of the symbol 0.

At block 1340, the method 1300 includes transmitting, to a second sidelink UE, the second sidelink transmission with the CP extension. In some examples, the first sidelink UE may transmit the second sidelink transmission with the CP extension.

In some examples, the first sidelink UE may detect the first sidelink transmission from a third sidelink UE, where the first sidelink transmission includes COT sharing information. The second sidelink UE may be the same as or different from the third sidelink UE. In some examples, the first sidelink UE may perform an LBT during the gap duration and transmit the second sidelink transmission if the LBT is successful. The second sidelink transmission may include PSFCH, PSCCH, and/or PSSCH. In some examples, the gap duration may occur before the first sidelink UE transmits the second sidelink transmission.

In some examples, the first sidelink transmission is included in a first frequency interlace in the COT, and the second sidelink transmission is included in a second frequency interface in the COT. In some examples, the first sidelink UE may transmit the second sidelink transmission starting at a first symbol and then apply the CP extension to a second symbol preceding the first symbol. In some examples, the first sidelink UE detects the first sidelink transmission in a first slot in the COT and transmits the second sidelink transmission in a second slot in the COT. The first slot may be the same as or different from the second slot.

In some examples, the first sidelink UE may detect the first sidelink transmission in a first slot in the COT. The first sidelink transmission may end at a first symbol in the first slot, and the first slot may be devoid of PSFCH. The first sidelink UE may transmit the second sidelink transmission in a next slot after the first slot, and the LBT gap time threshold may be 16 µs. In some examples, the first sidelink UE may perform a category 2 (CAT2) LBT and acquire the COT if the CAT2 LBT is successful. In some examples, the first sidelink UE may perform a CAT1 LBT to transmit the second sidelink transmission with the CP extension.

In some examples, the first sidelink UE may determine a third sidelink transmission that is transmitted between the first and second sidelink transmissions in the COT, and the multiple sidelink UEs may include a third sidelink UE that transmitted the third sidelink transmission. The LBT gap time threshold may be 25 µs. In an example, the first sidelink UE may determine the third sidelink transmission based on the COT configuration (e.g., if there is a PSFCH opportunity configured at the end of the slot). In another example, the first sidelink UE may determine the first sidelink transmission based on COT sharing information (if the first SL transmission ended already).

In some examples, the first sidelink UE may determine a second CP extension length for transmitting a third sidelink transmission. The first sidelink UE may transmit the second sidelink transmission in a first slot, and the first CP extension length may be different from the second CP extension length. The first sidelink UE may transmit the third sidelink transmission in a second slot, where the first and second slots are continuous slots. In some examples, the first sidelink UE may puncture a first symbol in a first slot in the COT. The first gap duration may include the punctured portion of the first symbol and a second gap duration, and the second gap duration may occur in a second symbol immediately preceding the first symbol. Additionally, the LBT gap time threshold may be 25 µs.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of [at least one of A, B, or C] means A or B or C or AB or AC or BC or ABC (i.e., A and B and C).

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method of wireless communication performed by a first sidelink user equipment (UE), comprising:
    detecting a first sidelink transmission in a channel occupancy time (COT), the COT for sharing with multiple sidelink UEs including the first sidelink UE;
    determining a cyclic prefix (CP) extension length for transmitting a second sidelink transmission after the first sidelink transmission, a gap duration between the first sidelink transmission and the second sidelink transmission satisfying a listen-before-talk (LBT) gap time threshold;
    applying a CP extension having the CP extension length to the second sidelink transmission; and
    transmitting, to a second sidelink UE, the second sidelink transmission with the CP extension.

2. The method of claim 1 performed by the first sidelink UE, further comprising:
    performing an LBT during the gap duration, wherein the transmitting the second sidelink transmission includes transmitting the second sidelink transmission based on the LBT being successful.

3. The method of claim 1, wherein the LBT gap time threshold is at least one of 16 microseconds or 25 microseconds.

4. The method of claim 1 performed by the first sidelink UE, further comprising:
    monitoring for sidelink channel information (SCI) indicating COT sharing information on the COT.

5. The method of claim 1, wherein the second sidelink transmission includes a physical sidelink feedback channel (PSFCH), and the LBT gap time threshold is 16 microseconds.

6. The method of claim 1, wherein the second sidelink transmission includes at least one of a physical sidelink control channel (PSCCH) or a physical sidelink shared channel (PSSCH).

7. The method of claim 1, wherein the first sidelink transmission is included in a first frequency interlace in the COT, and the second sidelink transmission is included in a second frequency interface in the COT.

8. The method of claim 1, wherein the transmitting the second sidelink transmission includes transmitting the second sidelink transmission starting at a first symbol, and the applying includes applying the CP extension to a second symbol preceding the first symbol.

9. The method of claim 1, wherein the detecting the first sidelink transmission includes detecting the first sidelink transmission in a first slot in the COT, and wherein transmitting the second sidelink transmission includes transmitting the second sidelink transmission in a second slot in the COT.

10. The method of claim 9, wherein the first slot is different from the second slot.

11. The method claim 9, wherein the first slot is the same as the second slot.

12. The method of claim 1 performed by the first sidelink UE, further comprising:
    performing a category 2 (CAT2) LBT; and
    acquiring the COT based on the CAT2 LBT being successful.

13. The method of claim 1 performed by the first sidelink UE, further comprising:
    performing a category 1 (CAT1) LBT to transmit the second sidelink transmission with the CP extension.

14. The method of claim 1, wherein the detecting the first sidelink transmission includes detecting the first sidelink transmission in a first slot in the COT, the first sidelink transmission ends at a first symbol in the first slot, and the first slot is devoid of PSFCH, and wherein the transmitting the second sidelink transmission includes transmitting the second sidelink transmission in a next slot after the first slot.

15. The method of claim 1 performed by the first sidelink UE, further comprising:
    determining a third sidelink transmission that is transmitted between the first and second sidelink transmissions in the COT, the multiple sidelink UEs including a third sidelink UE that transmitted the third sidelink transmission.

16. The method of claim 1 performed by the first sidelink UE, further comprising:
    determining a second CP extension length for transmitting a third sidelink transmission, wherein the transmitting the second sidelink transmission includes transmitting the second sidelink transmission in a first slot, and the first CP extension length being different from the second CP extension length; and
    transmitting the third sidelink transmission in a second slot, the first and second slots being continuous slots.

17. The method of claim 1 performed by the first sidelink UE, further comprising:
    puncturing a first symbol in a first slot in the COT, wherein the first gap duration includes a punctured portion of the first symbol and a second gap duration, and the second gap duration is in a second symbol immediately preceding the first symbol.

18. The method of claim 1, wherein the detecting the first sidelink transmission includes detecting the first sidelink transmission from a third sidelink UE, the first sidelink transmission including COT sharing information.

19. The method of claim 1, wherein the gap duration occurs before the second sidelink transmission.

20. A user equipment (UE), comprising:
    a processor configured to:
    detect a first sidelink transmission in a channel occupancy time (COT), the COT for sharing with multiple sidelink UEs including the UE, wherein the UE is a first sidelink UE;
    determine a cyclic prefix (CP) extension length for transmitting a second sidelink transmission after the first sidelink transmission, wherein a gap duration between the first sidelink transmission and the second sidelink transmission satisfies a listen-before-talk (LBT) gap time threshold; and
    apply a CP extension having the CP extension length to the second sidelink transmission; and
    a transceiver configured to transmit, to a second sidelink UE, the second sidelink transmission with the CP extension.

21. A non-transitory computer-readable medium having program code recorded thereon, the program code comprising:
    code for causing a first sidelink user equipment (UE) to detect a first sidelink transmission in a channel occupancy time (COT), the COT for sharing with multiple sidelink UEs including the first sidelink UE;

code for causing the first sidelink UE to determine a cyclic prefix (CP) extension length for transmitting a second sidelink transmission after the first sidelink transmission, wherein a gap duration between the first sidelink transmission and the second sidelink transmission satisfies a listen-before-talk (LBT) gap time threshold;

code for causing the first sidelink UE to apply a CP extension having the CP extension length to the second sidelink transmission; and code for causing the first sidelink UE to transmit, to a second sidelink UE, the second sidelink transmission with the CP extension.

22. A user equipment (UE) comprising:
means for detecting a first sidelink transmission in a channel occupancy time (COT), the COT for sharing with multiple sidelink UEs;
means for determining a cyclic prefix (CP) extension length for transmitting a second sidelink transmission after the first sidelink transmission, a gap duration between the first sidelink transmission and the second sidelink transmission satisfying a listen-before-talk (LBT) gap time threshold;
means for applying a CP extension having the CP extension length to the second sidelink transmission; and
means for transmitting, to a second sidelink UE, the second sidelink transmission with the CP extension.

23. The UE of claim 22, further comprising:
means for performing an LBT during the gap duration, wherein the means for transmitting the second sidelink transmission includes means for transmitting the second sidelink transmission if the LBT is successful.

24. The UE of claim 22, wherein the LBT gap time threshold is 16 microseconds.

25. The UE of claim 22, wherein the LBT gap time threshold is 25 microseconds.

26. The UE of claim 22, further comprising:
means for monitoring for sidelink channel information (SCI) indicating COT sharing information on the COT.

27. The UE of claim 22, wherein the second sidelink transmission includes a physical sidelink feedback channel (PSFCH), and the LBT gap time threshold is 16 microseconds.

28. The UE of claim 22, wherein the second sidelink transmission includes at least one of a physical sidelink control channel (PSCCH) or a physical sidelink shared channel (PSSCH).

29. The UE of claim 22, wherein the first sidelink transmission is included in a first frequency interlace in the COT, and the second sidelink transmission is included in a second frequency interface in the COT.

30. The UE of claim 22, further comprising:
means for puncturing a first symbol in a first slot in the COT, wherein the first gap duration includes a punctured portion of the first symbol and a second gap duration, and the second gap duration is in a second symbol immediately preceding the first symbol.

31. The UE of claim 30, wherein the LBT gap time threshold is 25 microseconds.

32. The UE of claim 22, wherein the means for detecting the first sidelink transmission includes means for detecting the first sidelink transmission from a third sidelink UE, the first sidelink transmission including COT sharing information.

33. The UE of claim 32, wherein the second sidelink UE is the same as the third sidelink UE.

34. The UE of claim 32, wherein the second sidelink UE is different from the third sidelink UE.

35. The UE of claim 22, wherein the gap duration occurs before the second sidelink transmission.

* * * * *